(12) United States Patent
Garthwaite

(10) Patent No.: US 7,676,801 B1
(45) Date of Patent: Mar. 9, 2010

(54) SCANNING OF EVACUATED OBJECTS IN A GENERATION MANAGED BY THE TRAIN ALGORITHM

(75) Inventor: Alexander T. Garthwaite, Beverly, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 1117 days.

(21) Appl. No.: 10/930,483

(22) Filed: Aug. 31, 2004

(51) Int. Cl.
G06F 9/44 (2006.01)
G06F 21/00 (2006.01)

(52) U.S. Cl. ............................ 717/165; 717/162; 711/6

(58) Field of Classification Search .................. 717/162
See application file for complete search history.

(56) References Cited

U.S. PATENT DOCUMENTS

| | | |
|---|---|---|
| 4,724,521 A | 2/1988 | Carron et al. |
| 4,797,810 A | 1/1989 | McEntee et al. |
| 4,912,629 A | 3/1990 | Shuler, Jr. |
| 4,989,134 A | 1/1991 | Shaw |
| 5,088,036 A | 2/1992 | Ellis et al. |
| 5,333,318 A | 7/1994 | Wolf |
| 5,392,432 A | 2/1995 | Engelstad et al. |
| 5,485,613 A | 1/1996 | Engelstad et al. |
| 5,560,003 A | 9/1996 | Nilson et al. |
| 5,687,370 A | 11/1997 | Garst et al. |
| 5,801,943 A | 9/1998 | Nasburg |
| 5,845,276 A | 12/1998 | Kirsch et al. |
| 5,845,298 A | 12/1998 | O'Connor et al. |
| 5,857,210 A | 1/1999 | Tremblay et al. |
| 5,873,104 A | 2/1999 | Tremblay et al. |
| 5,873,105 A | 2/1999 | Tremblay et al. |
| 5,900,001 A | 5/1999 | Wolczko et al. |

(Continued)

FOREIGN PATENT DOCUMENTS

EP 0 904 055 A1 9/1999

(Continued)

OTHER PUBLICATIONS

Jones and Lins, "Garbage Collection: Algorithms for Automatic Dynamic Memory Management", 1996, pp. 167-181, John Wiley and Sons, NY.

(Continued)

Primary Examiner—Jason Mitchell
(74) Attorney, Agent, or Firm—Osha • Liang LLP

(57) ABSTRACT

In computer systems including memory which execute programs of instructions, vtables associated with objects contain pointers which invoke operations to be performed by the program which are related to the objects. The operation invoked may include the step of modifying the pointer such that upon a subsequent reference to the vtable a different operation is invoked. In one embodiment, such vtables are utilized in conjunction with garbage collection methodologies such as those that invoke the train algorithm, such that operations such as reference processing, insertion and scanning during garbage collection may be invoked by pointers in vtables associated with cars or objects in the cars, and the vtables may invoke differing versions of the said operations depending on the characteristics and past history of the car or object, and upon an operation being executed the operation may change the pointer so that a different version of the operation is performed upon a subsequent reference to the vtable associated with the car or object.

24 Claims, 25 Drawing Sheets

U.S. PATENT DOCUMENTS

| | | | |
|---|---|---|---|
| 5,903,900 | A | 5/1999 | Knippel et al. |
| 5,930,807 | A | 7/1999 | Ebrahim et al. |
| 5,953,736 | A | 9/1999 | O'Connor et al. |
| 5,960,087 | A | 9/1999 | Tribble et al. |
| 5,999,974 | A | 12/1999 | Ratcliff et al. |
| 6,021,415 | A | 2/2000 | Cannon et al. |
| 6,047,125 | A | 4/2000 | Agesen et al. |
| 6,049,390 | A | 4/2000 | Notredame et al. |
| 6,049,810 | A | 4/2000 | Schwartz et al. |
| 6,065,020 | A | 5/2000 | Dussud |
| 6,098,089 | A | 8/2000 | O'Connor et al. |
| 6,148,309 | A | 11/2000 | Azagury et al. |
| 6,148,310 | A | 11/2000 | Azagury et al. |
| 6,173,294 | B1 | 1/2001 | Azagury et al. |
| 6,185,581 | B1 | 2/2001 | Garthwaite |
| 6,226,653 | B1 | 5/2001 | Alpern et al. |
| 6,243,720 | B1 | 6/2001 | Munter et al. |
| 6,260,120 | B1 | 7/2001 | Blumenau et al. |
| 6,289,358 | B1 | 9/2001 | Mattis et al. |
| 6,308,185 | B1 | 10/2001 | Grarup et al. |
| 6,314,436 | B1 | 11/2001 | Houldsworth |
| 6,321,240 | B1 | 11/2001 | Chilimbi et al. |
| 6,353,838 | B2 | 3/2002 | Sauntry et al. |
| 6,381,738 | B1 | 4/2002 | Choi et al. |
| 6,393,439 | B1 | 5/2002 | Houldsworth et al. |
| 6,415,302 | B1 | 7/2002 | Garthwaite et al. |
| 6,424,977 | B1 | 7/2002 | Garthwaite |
| 6,434,576 | B1 | 8/2002 | Garthwaite |
| 6,434,577 | B1 | 8/2002 | Garthwaite |
| 6,442,661 | B1 | 8/2002 | Dreszer |
| 6,449,618 | B1 * | 9/2002 | Blott et al. .................. 707/101 |
| 6,449,626 | B1 | 9/2002 | Garthwaite et al. |
| 6,496,871 | B1 | 12/2002 | Jagannathan et al. |
| 6,529,919 | B1 * | 3/2003 | Agesen et al. .............. 707/206 |
| 6,567,905 | B2 | 5/2003 | Otis |
| 6,640,278 | B1 | 10/2003 | Nolan et al. |
| 6,757,890 | B1 | 6/2004 | Wallman |
| 6,769,004 | B2 | 7/2004 | Barrett |
| 6,820,101 | B2 | 11/2004 | Wallman |
| 6,826,583 | B1 | 11/2004 | Flood et al. |
| 6,868,488 | B2 | 3/2005 | Garthwaite |
| 6,892,212 | B2 | 5/2005 | Shuf et al. |
| 6,928,450 | B2 | 8/2005 | Nagarajan et al. |
| 6,931,423 | B2 | 8/2005 | Sexton et al. |
| 2001/0047394 | A1 * | 11/2001 | Kloba et al. ................ 709/217 |
| 2002/0032719 | A1 | 3/2002 | Thomas et al. |
| 2002/0095453 | A1 | 7/2002 | Steensgaard |
| 2002/0133533 | A1 | 9/2002 | Czajkowski et al. |
| 2002/0138506 | A1 | 9/2002 | Shuf et al. |
| 2003/0088658 | A1 | 5/2003 | Davies et al. |
| 2003/0131347 | A1 * | 7/2003 | Allison ....................... 717/165 |
| 2003/0200392 | A1 | 10/2003 | Wright et al. |
| 2003/0217027 | A1 | 11/2003 | Farber et al. |
| 2004/0010586 | A1 | 1/2004 | Burton et al. |
| 2004/0039759 | A1 | 2/2004 | Detlefs et al. |
| 2004/0215914 | A1 | 10/2004 | Dussud |

FOREIGN PATENT DOCUMENTS

| | | |
|---|---|---|
| EP | 0 969 377 A1 | 1/2000 |
| WO | WO0188713 A2 | 11/2001 |

OTHER PUBLICATIONS

Printezis, et al., "Visualising the Train Garbage Collector", ISMM '02, 2002, pp. 50-63, Berlin, Germany.

U.S. Appl. No. 10/287,851, filed Nov. 5, 2002, Garthwaite, et al.

Appel, "Simple Generational Garbage Collection and Fast Allocation", Software Practice and Experience, 19(2), 1989, 171-183.

Appel, et al., "Real-Time Concurrent Collection on Stock Multiprocessors", ACM SIGPLAN Notices, 1988.

Appleby, Karen, "Garbage Collection for Prolog Based on WAM, vol. 31, Issue 6", Communication of the ACM, Jun. 1, 1998, 719-741.

Arora, et al., "Thread Scheduling for Multiprogrammed Multiprocessors", Proceedings of the 10th Annual ACM Symposium on Parallel Algorithms and Architecture, Jun. 1998.

Bacon, et al., "Java without the Coffee Breaks: A nonintrusive Multiprocessor Garbage Collector", SIGPLAN Conference on Programming Language Design and Implementation, Jun. 2001, Snowbird, UT.

Baker, "List Processing in Real Time on a Serial Computer", Communications of the ACM 21, Apr. 1978, 280-294.

Barrett, et al., "Using Lifetime Predictors to Improve Memory Allocation Performance", SIGPLAN'93 Conference on Programming Languages Design and Implementation vol. 28(6) of Notices, Jun. 1993, 187-196, ACM Press, Albuquerque, NM.

Blackburn & McKinley, "In or Out? Putting Write Barriers in Their Place", Jun. 20, 2002, Berlin.

Brooks, "Trading Data Space for Reduced Time and Code Space in Real-Time Garbage Collection on Stock Hardware", Proceedings of the 1984 Acm Symposium on Lisp and Funcional Programming, Aug. 1984, 108-113, Austin, TX.

Chilimbi, et al., "Using Generational Garbage Collection to Implement Cache-Conscious Data Placement", International Symposium on Memory Management, Oct. 1998.

Clark, "An Efficient List-Moving Algorithm Using Constant Workspace, vol. 19 No. 6", Communications of the ACM, Jun. 1976, 352-354 0.

Clark, et al., "Compacting Garbage Collection can be Fast and Simple", Software-Practice and Experience, vol. 26, No. 2, Feb. 1996, 177-194.

Courts, "Improving Locality of Reference in a Garbage-Collecting Memory Management System", Communications of the ACM, vol. 31, No. 9, Sep. 1988, 1128-1138.

Flood, et al., "Parallel Garbage Collection for Shared Memory Multiprocessors", USENIX JVM Conference, Apr. 2001.

Goldstein, et al., "Lazy Threads: Implementing a Fast Parallel Call, vol. 37, No. 1", Journal of Parallel and Distributed Computing, Aug. 1996, 5-20.

Grarup, et al., "Incremental Mature Garbage Collection", M.Sc.Thesis @ http://www.daimi.aau.dk/jacobse/Papers, Aug. 1993.

Hanson, "Fast Allocation and Deallocation of Memory Based on Object Lifetimes", Software Practice and Experience, Jan. 1990, 20(1):5-12.

Harris, "Dynamic Adaptive Pre-Tenuring", In Proceedings of the Int'l Symposium on Memory Management, Oct. 2000, 127-136.

Herlihy, et al., "Lock-Free Garbage Collection for Multiprocessors", ACM SPAA, 1991, 229-236.

Holzle, Urs, "A Fast Write Barrier for Generational Garbage Collectors", Workshop on Garbage Collection in Object Oriented Systems, Oct. 1993.

Hosking, et al., "Remembered Sets Can Also Play Cards", OOPSLA/ECOOP Workshop on Garbage Collection in Object-Oriented Systems, Oct. 1993.

Hosking, et al., "Protection Traps and Alternatives for Memory Management of an Object-Oriented Language", Object Systems Laboratory, Dec. 1993, 1-14, Dept. of Comp. Sci., Amherst, MA.

Hudson, et al., "Adaptive Garbage Collection for Modula-3 and Small Talk", OOPSLA.ECOOP '90 Workshop on Garbage Collection in Object-Oriented Systems, Oct. 27, 1990.

Hudson, et al., "A Language—Independent Garbage Collector Toolkit", Coins Techincal Report, Sep. 1991.

Hudson, et al., "Incremental Collection of Mature Objects", Proceedings of the Int'l Workshop on Memory Managment, 1992, pp. 1-16, Springer-Verlag.

Hudson, et al., "Training Distributed Garbage: The DMOS Collector", University of St. Andrews Tech Report, 1997, 1-26.

Hudson, et al., "Garbage Collecting the World: One Car at a Time", ACM SIGPLAN Notices 32, 1997, 162-175.

Hudson, et al., "Sapphire: Copying GC Without Stopping the World", Practice and Experience Special Issue, Date Unknown, JAVA/Grande/Iscope.

Jones and Lins, "Garbage Collection: Algorithms for Automatic Dynamic Memory Management", 1996, 165-179, John Wiley and Sons, NY.

Lieberman, et al., "A Real-Time Garbage Collector Based on the Lifetimes of Objects", Communications of the ACM, 1983, 26(6).

Liskov, et al., "Partitioned Garbage Collection of a Large Stable Heap", Proceedings of IWOOOS, 1996, 117-121.

Moon, "Garbage Collection in a Large Lisp System", Conference Record of the 1984 ACM Symposium on LISP and Functional Programming, Aug. 1984, 235-246, Austin, TX.

Moss, et al., "A Complete and Coarse-Grained Incremental Garbage Collection for Persisten Object Strores", Proceedings 7th Int'l Workshop on Persisten Object System, 1996, 1-13, Cape May, NJ.

Munro, et al., "Incremental Garbage Collection of a Persistent Object Store using PMOS", 3rd Int'l Workshop on Persistence and Java, 1998, 78-91, Tiburon, California.

Nettles, Scott, "Real-Time Replication Garbage Collection", Avionics Lab, Wright Research and Development Center, 1993, PDDI.

Padopoulos, "Hood: A User-Level Thread Library for Multiprogramming Multiprocessors, Thesis: The Uni. of TX", University of Texas, Aug. 1998, 1-71, Austin.

Roy, et al., "Garbage Collection in Object-Oriented Databases Using Transactional Cyclic Reference Counting", VLDB Journal—The International Journal on Very Large Da Bases, vol. 7, Issue 3, 1998, 179-193.

Seligmann, et al., "Incremental Mature Garbage Collection, In the European Conference on Object-Oriented Programming", M.Sc. Thesis @ http://www.daimi.aau.dk/jacobse/Papers/, 1995.

Shuf, et al., "Exploiting Profilic Types for Memory Management and Optimizations. ACM ISBN Sep. 2, 2001", POPL, Jan. 2002, Portland.

Sobalvarro, "A Lifetime-based Garbage Collector for LISP Systems on General-Purpose Computers", Department of Electrical Engineering and Computer Science at MIT, Sep. 1988, AITR-1417.

Stamos, "Static Grouping of Small Objects to Enhance Performance of a Paged Virtual Memory", ACM Transactions on Computer Systems, vol. 2, No. 2, May 1984, 155-180.

Ungar, "Generation Scavenging: A Non-Disruptive High Performance Storage Reclaration Algorithm", ACM SIGPLAN Notices, Apr. 1984, 19(5).

Ungar, et al., "Tenuring Policies for Generation-Based Storage Reclamation", ACM SIGPLAN Notices, 1988, 23(11)1-17.

Venners, "Garbage Collection, Inside the Java 2 Virtual Machine; Chapter 9", www.artima.com, Date Unknown, parts 1-18.

Wilson, "Uniprocessor Garbage Collection Techniques", Proceedings of Int'l Workshop on Memory Management, 1992, V. 637.

Wilson, "Uniprocessor Garbage Collection Techniques", Technical Report, University of Texas, 1994.

Withington, P.T., "How Real is "Real-Time" GC?", Symbolics, Inc., Oct. 6, 1991, Burlington, MA.

Zee, et al., "Write Barrier Removal by Static Analysis", OOPSLA '02, Nov. 2002.

Zorn, "Segregating Heap Objects by Reference Behavior and Lifetime", In 8th Int'l Conferenceon Architectural Support for Programming Languages and Operating Systems, Oct. 1998, 12-32, San Jose, CA.

Zorn, Benjamin, "Barrier Methods for Garbage Collection", Dept. of Computer Science, Uni. of Colorado, Nov. 1990, 1-37, Boulder.

Azagury, et al., "Combining Card Marking With Remembered Sets: How to Save Scanning Time", ACM SIGPLAN Notices, Oct. 1998, V. 34(3), ACM Press, Vancouver, Canada.

Cheney, "A Nonrecursive List Compacting Algorithm, vol. 13, No. 11", Communications of the ACM, Nov. 1970, 677-678, Uni. Math. Lab., Cambridge, European Patent Office.

Cheng, et al., "Generational Stack Collection and Profile-Driven Pretenuring", SIGPLAN'98 Conference on Programming Languages Design and Implementation, Jun. 1998, 162-173, ACM Press, Montreal, Canada.

Hosking, et al., "A Comparative Performance Evaluation of Write Barrier Implementations", OOPSLA; ACM Conference on Object-Oriented Systems, Languages and Applications, Oct. 1992, V. 27(10), ACM Press, Vancouver, Canada.

Lam, et al., "Object Type Directed Garbage Collection to Improve Locality", Proceedings of the International Workshop on Memory Management, Sep. 1992, 404-425, St. Malo, France.

Lam, et al., "Effective Static-Graph Reorganization to Improve Locality in Garbage Collected Systems", Proceedings of ACM SIGPLAN Conference on Programming Language Design and Implementation, Jun. 1991, Toronto, Canada.

Pirinen, Pekka, "Barrier Techniques for Incremental Tracing", Harlequin Limited, Date Unknown, 20-25, Cambridge, Great Britain.

Wilson, et al., "Effective Static-Graph Reorganization to Improve Locality in Garbage Collected Systems", Proceedings of ACM SIGPLAN Conference on Programming Language Design and Implementation, Jun. 1991, Canada.

* cited by examiner

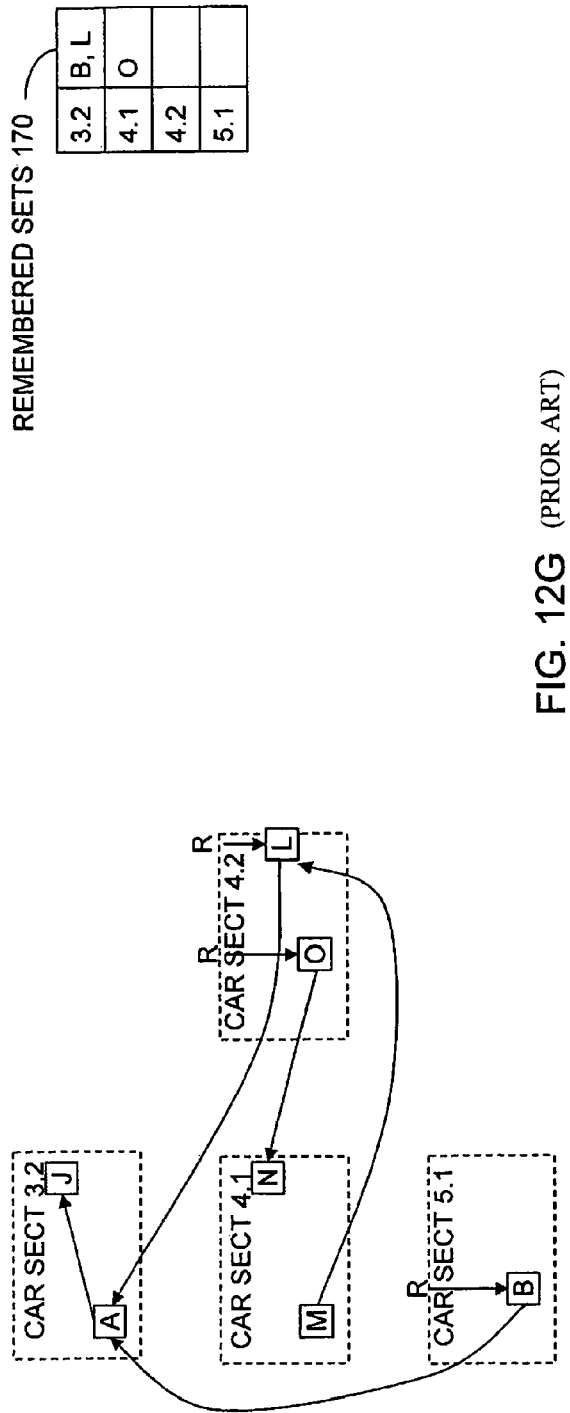
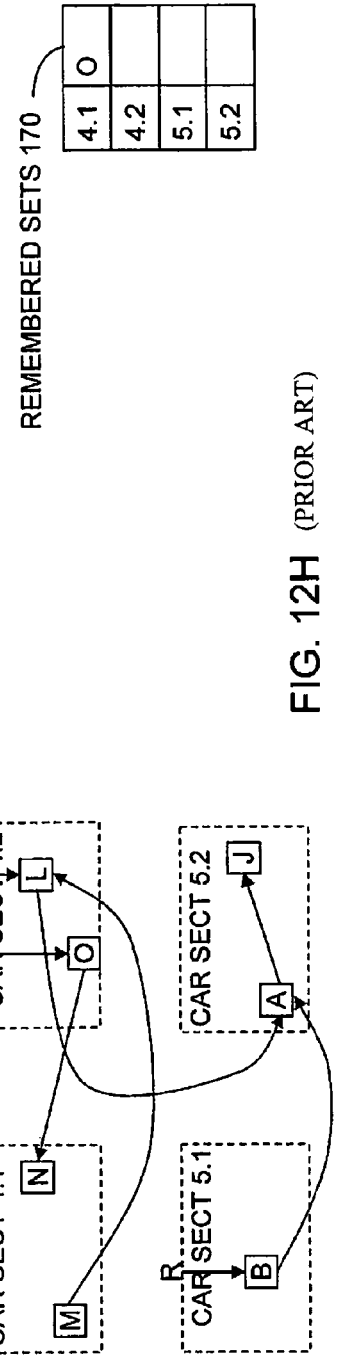
FIG. 12G (PRIOR ART)
FIG. 12H (PRIOR ART)

SCANNING OF EVACUATED OBJECTS IN A GENERATION MANAGED BY THE TRAIN ALGORITHM

BACKGROUND OF THE INVENTION

1. Field of the Invention

The present invention is directed to memory management. It particularly concerns what has come to be known as "garbage collection."

2. Background Information

In the field of computer systems, considerable effort has been expended on the task of allocating memory to data objects. For the purposes of this discussion, the term object refers to a data structure represented in a computer system's memory. Other terms sometimes used for the same concept are record and structure. An object may be identified by a reference, a relatively small amount of information that can be used to access the object. A reference can be represented as a "pointer" or a "machine address," which may require, for instance, only sixteen, thirty-two, or sixty-four bits of information, although there are other ways to represent a reference.

In some systems, which are usually known as "object oriented," objects may have associated methods, which are routines that can be invoked by reference to the object. They also may belong to a class, which is an organizational entity that may contain method code or other information shared by all objects belonging to that class. In the discussion that follows, though, the term object will not be limited to such structures; it will additionally include structures with which methods and classes are not associated.

The invention to be described below is applicable to systems that allocate memory to objects dynamically. Not all systems employ dynamic allocation. In some computer languages, source programs must be so written that all objects to which the program's variables refer are bound to storage locations at compile time. This storage-allocation approach, sometimes referred to as "static allocation," is the policy traditionally used by the Fortran programming language, for example.

Even for compilers that are thought of as allocating objects only statically, of course, there is often a certain level of abstraction to this binding of objects to storage locations. Consider the typical computer system 10 depicted in FIG. 1, for example. Data, and instructions for operating on them, that a microprocessor 11 uses may reside in on-board cache memory or be received from further cache memory 12, possibly through the mediation of a cache controller 13. That controller 13 can in turn receive such data from system read/write memory ("RAM") 14 through a RAM controller 15 or from various peripheral devices through a system bus 16. The memory space made available to an application program may be "virtual" in the sense that it may actually be considerably larger than RAM 14 provides. So the RAM contents will be swapped to and from a system disk 17.

Additionally, the actual physical operations performed to access some of the most-recently visited parts of the process's address space often will actually be performed in the cache 12 or in a cache on board microprocessor 11 rather than on the RAM 14, with which those caches swap data and instructions just as RAM 14 and system disk 17 do with each other.

A further level of abstraction results from the fact that an application will often be run as one of many processes operating concurrently with the support of an underlying operating system. As part of that system's memory management, the application's memory space may be moved among different actual physical locations many times in order to allow different processes to employ shared physical memory devices. That is, the location specified in the application's machine code may actually result in different physical locations at different times because the operating system adds different offsets to the machine-language-specified location.

Despite these expedients, the use of static memory allocation in writing certain long-lived applications makes it difficult to restrict storage requirements to the available memory space. Abiding by space limitations is easier when the platform provides for dynamic memory allocation, i.e., when memory space to be allocated to a given object is determined only at run time.

Dynamic allocation has a number of advantages, among which is that the run-time system is able to adapt allocation to run-time conditions. For example, the programmer can specify that space should be allocated for a given object only in response to a particular run-time condition. The C-language library function malloc( ) is often used for this purpose. Conversely, the programmer can specify conditions under which memory previously allocated to a given object can be reclaimed for reuse. The C-language library function free( ) results in such memory reclamation.

Because dynamic allocation provides for memory reuse, it facilitates generation of large or long-lived applications, which over the course of their lifetimes may employ objects whose total memory requirements would greatly exceed the available memory resources if they were bound to memory locations statically.

Particularly for long-lived applications, though, allocation and reclamation of dynamic memory must be performed carefully. If the application fails to reclaim unused memory—or, worse, loses track of the address of a dynamically allocated segment of memory—its memory requirements will grow over time to exceed the system's available memory. This kind of error is known as a "memory leak."

Another kind of error occurs when an application reclaims memory for reuse even though it still maintains a reference to that memory. If the reclaimed memory is reallocated for a different purpose, the application may inadvertently manipulate the same memory in multiple inconsistent ways. This kind of error is known as a "dangling reference," because an application should not retain a reference to a memory location once that location is reclaimed. Explicit dynamic-memory management by using interfaces like malloc( )/free( ) often leads to these problems.

A way of reducing the likelihood of such leaks and related errors is to provide memory-space reclamation in a more-automatic manner. Techniques used by systems that reclaim memory space automatically are commonly referred to as "garbage collection." Garbage collectors operate by reclaiming space that they no longer consider "reachable." Statically allocated objects represented by a program's global variables are normally considered reachable throughout a program's life. Such objects are not ordinarily stored in the garbage collector's managed memory space, but they may contain references to dynamically allocated objects that are, and such objects are considered reachable. Clearly, an object referred to in the processor's call stack is reachable, as is an object referred to by register contents. And an object referred to by any reachable object is also reachable.

The use of garbage collectors is advantageous because, whereas a programmer working on a particular sequence of code can perform his task creditably in most respects with only local knowledge of the application at any given time, memory allocation and reclamation require a global knowledge of the program. Specifically, a programmer dealing with a given sequence of code does tend to know whether some portion of memory is still in use for that sequence of code, but it is considerably more difficult for him to know what the rest of the application is doing with that memory. By tracing references from some conservative notion of a "root set," e.g., global variables, registers, and the call stack, automatic garbage collectors obtain global knowledge in a methodical way. By using a garbage collector, the programmer is relieved of the need to worry about the application's global state and can concentrate on local-state issues, which are more manageable. The result is applications that are more robust, having no dangling references and fewer memory leaks.

Garbage-collection mechanisms can be implemented by various parts and levels of a computing system. One approach is simply to provide them as part of a batch compiler's output. Consider FIG. 2's simple batch-compiler operation, for example. A computer system executes in accordance with compiler object code and therefore acts as a compiler 20. The compiler object code is typically stored on a medium such as FIG. 1's system disk 17 or some other machine-readable medium, and it is loaded into RAM 14 to configure the computer system to act as a compiler. In some cases, though, the compiler object code's persistent storage may instead be provided in a server system remote from the machine that performs the compiling. The electrical signals that carry the digital data by which the computer systems exchange that code are examples of the kinds of electro-magnetic signals by which the computer instructions can be communicated. Others are radio waves, microwaves, and both visible and invisible light.

The input to the compiler is the application source code, and the end product of the compiler process is application object code. This object code defines an application 21, which typically operates on input such as mouse clicks, etc., to generate a display or some other type of output. This object code implements the relationship that the programmer intends to specify by his application source code. In one approach to garbage collection, the compiler 20, without the programmer's explicit direction, additionally generates code that automatically reclaims unreachable memory space.

Even in this simple case, though, there is a sense in which the application does not itself provide the entire garbage collector. Specifically, the application will typically call upon the underlying operating system's memory-allocation functions. And the operating system may in turn take advantage of various hardware that lends itself particularly to use in garbage collection. So even a very simple system may disperse the garbage-collection mechanism over a number of computer-system layers.

To get some sense of the variety of system components that can be used to implement garbage collection, consider FIG. 3's example of a more complex way in which various levels of source code can result in the machine instructions that a processor executes. In the FIG. 3 arrangement, the human applications programmer produces source code 22 written in a high-level language. A compiler 23 typically converts that code into "class files." These files include routines written in instructions, called "byte codes" 24, for a "virtual machine" that various processors can be software-configured to emulate. This conversion into byte codes is almost always separated in time from those codes' execution, so FIG. 3 divides the sequence into a "compile-time environment" 25 separate from a "run-time environment" 26, in which execution occurs. One example of a high-level language for which compilers are available to produce such virtual-machine instructions is the Java™ programming language. (Java is a trademark or registered trademark of Sun Microsystems, Inc., in the United States and other countries.)

Most typically, the class files' byte-code routines are executed by a processor under control of a virtual-machine process 27. That process emulates a virtual machine from whose instruction set the byte codes are drawn. As is true of the compiler 23, the virtual-machine process 27 may be specified by code stored on a local disk or some other machine-readable medium from which it is read into FIG. 1's RAM 14 to configure the computer system to implement the garbage collector and otherwise act as a virtual machine. Again, though, that code's persistent storage may instead be provided by a server system remote from the processor that implements the virtual machine, in which case the code would be transmitted electrically or optically to the virtual-machine-implementing processor.

In some implementations, much of the virtual machine's action in executing these byte codes is most like what those skilled in the art refer to as "interpreting," so FIG. 3 depicts the virtual machine as including an "interpreter" 28 for that purpose. In addition to or instead of running an interpreter, many virtual-machine implementations actually compile the byte codes concurrently with the resultant object code's execution, so FIG. 3 depicts the virtual machine as additionally including a "just-in-time" compiler 29. We will refer to the just-in-time compiler and the interpreter together as "execution engines" since they are the methods by which byte code can be executed.

Now, some of the functionality that source-language constructs specify can be quite complicated, requiring many machine-language instructions for their implementation. One quite-common example is a source-language instruction that calls for 64-bit arithmetic on a 32-bit machine. More germane to the present invention is the operation of dynamically allocating space to a new object; the allocation of such objects must be mediated by the garbage collector.

In such situations, the compiler may produce "inline" code to accomplish these operations. That is, all object-code instructions for carrying out a given source-code-prescribed operation will be repeated each time the source code calls for the operation. But inlining runs the risk that "code bloat" will result if the operation is invoked at many source-code locations.

The natural way of avoiding this result is instead to provide the operation's implementation as a procedure, i.e., a single code sequence that can be called from any location in the program. In the case of compilers, a collection of procedures for implementing many types of source-code-specified operations is called a runtime system for the language. The execution engines and the runtime system of a virtual machine are designed together so that the engines "know" what runtime-system procedures are available in the virtual machine (and on the target system if that system provides facilities that are directly usable by an executing virtual-machine program.) So, for example, the just-in-time compiler 29 may generate native code that includes calls to memory-allocation procedures provided by the virtual machine's runtime system. These allocation routines may in turn invoke garbage-collection routines of the runtime system when there is not enough memory available to satisfy an allocation. To represent this fact, FIG. 3 includes block 30 to show that the compiler's output makes calls to the runtime system as well as to the operating system 31, which consists of procedures that are similarly system-resident but are not compiler-dependent.

Although the FIG. 3 arrangement is a popular one, it is by no means universal, and many further implementation types can be expected. Proposals have even been made to implement the virtual machine 27's behavior in a hardware processor, in which case the hardware itself would provide some or all of the garbage-collection function.

The arrangement of FIG. 3 differs from FIG. 2 in that the compiler 23 for converting the human programmer's code does not contribute to providing the garbage-collection function; that results largely from the virtual machine 27's operation. Those skilled in that art will recognize that both of these organizations are merely exemplary, and many modern systems employ hybrid mechanisms, which partake of the characteristics of traditional compilers and traditional interpreters both.

The invention to be described below is applicable independently of whether a batch compiler, a just-in-time compiler, an interpreter, or some hybrid is employed to process source code. In the remainder of this application, therefore, we will use the term compiler to refer to any such mechanism, even if it is what would more typically be called an interpreter.

In short, garbage collectors can be implemented in a wide range of combinations of hardware and/or software. As is true of most of the garbage-collection techniques described in the literature, the invention to be described below is applicable to most such systems.

By implementing garbage collection, a computer system can greatly reduce the occurrence of memory leaks and other software deficiencies in which human programming frequently results. But it can also have significant adverse performance effects if it is not implemented carefully. To distinguish the part of the program that does "useful" work from that which does the garbage collection, the term mutator is sometimes used in discussions of these effects; from the collector's point of view, what the mutator does is mutate active data structures' connectivity.

Some garbage-collection approaches rely heavily on interleaving garbage-collection steps among mutator steps. In one type of garbage-collection approach, for instance, the mutator operation of writing a reference is followed immediately by garbage-collector steps used to maintain a reference count in that object's header, and code for subsequent new-object storage includes steps for finding space occupied by objects whose reference count has fallen to zero. Obviously, such an approach can slow mutator operation significantly.

Other approaches therefore interleave very few garbage-collector-related instructions into the main mutator process but instead interrupt it from time to time to perform garbage-collection cycles, in which the garbage collector finds unreachable objects and reclaims their memory space for reuse. Such an approach will be assumed in discussing FIG. 4's depiction of a simple garbage-collection operation. Within the memory space allocated to a given application is a part 40 managed by automatic garbage collection. In the following discussion, this will be referred to as the "heap," although in other contexts that term refers to all dynamically allocated memory. During the course of the application's execution, space is allocated for various objects 42, 44, 46, 48, and 50. Typically, the mutator allocates space within the heap by invoking the garbage collector, which at some level manages access to the heap. Basically, the mutator asks the garbage collector for a pointer to a heap region where it can safely place the object's data. The garbage collector keeps track of the fact that the thus-allocated region is occupied. It will refrain from allocating that region in response to any other request until it determines that the mutator no longer needs the region allocated to that object.

Garbage collectors vary as to which objects they consider reachable and unreachable. For the present discussion, though, an object will be considered "reachable" if it is referred to, as object 42 is, by a reference in the root set 52. The root set consists of reference values stored in the mutator's threads' call stacks, the CPU registers, and global variables outside the garbage-collected heap. An object is also reachable if it is referred to, as object 46 is, by another reachable object (in this case, object 42). Objects that are not reachable can no longer affect the program, so it is safe to re-allocate the memory spaces that they occupy.

A typical approach to garbage collection is therefore to identify all reachable objects and reclaim any previously allocated memory that the reachable objects do not occupy. A typical garbage collector may identify reachable objects by tracing references from the root set 52. For the sake of simplicity, FIG. 4 depicts only one reference from the root set 52 into the heap 40. (Those skilled in the art will recognize that there are many ways to identify references, or at least data contents that may be references.) The collector notes that the root set points to object 42, which is therefore reachable, and that reachable object 42 points to object 46, which therefore is also reachable. But those reachable objects point to no other objects, so objects 44, 48, and 50 are all unreachable, and their memory space may be reclaimed. This may involve, say, placing that memory space in a list of free memory blocks.

To avoid excessive heap fragmentation, some garbage collectors additionally relocate reachable objects. FIG. 5 shows a typical approach. The heap is partitioned into two halves, hereafter called "semi-spaces." For one garbage-collection cycle, all objects are allocated in one semi-space 54, leaving the other semi-space 56 free. When the garbage-collection cycle occurs, objects identified as reachable are "evacuated" to the other semi-space 56, so all of semi-space 54 is then considered free. Once the garbage-collection cycle has occurred, all new objects are allocated in the lower semi-space 56 until yet another garbage-collection cycle occurs, at which time the reachable objects are evacuated back to the upper semi-space 54.

Although this relocation requires the extra steps of copying the reachable objects and updating references to them, it tends to be quite efficient, since most new objects quickly become unreachable, so most of the current semi-space is actually garbage. That is, only a relatively few, reachable objects need to be relocated, after which the entire semi-space contains only garbage and can be pronounced free for reallocation.

Now, a collection cycle can involve following all reference chains from the basic root set—i.e., from inherently reachable locations such as the call stacks, class statics and other global variables, and registers—and reclaiming all space occupied by objects not encountered in the process. And the simplest way of performing such a cycle is to interrupt the mutator to provide a collector interval in which the entire cycle is performed before the mutator resumes. For certain types of applications, this approach to collection-cycle scheduling is acceptable and, in fact, highly efficient.

For many interactive and real-time applications, though, this approach is not acceptable. The delay in mutator operation that the collection cycle's execution causes can be annoying to a user and can prevent a real-time application from responding to its environment with the required speed. In some applications, choosing collection times opportunistically can reduce this effect. Collection intervals can be inserted when an interactive mutator reaches a point at which it awaits user input, for instance.

So it may often be true that the garbage-collection operation's effect on performance can depend less on the total collection time than on when collections actually occur. But another factor that often is even more determinative is the duration of any single collection interval, i.e., how long the mutator must remain quiescent at any one time. In an interactive system, for instance, a user may never notice hundred-millisecond interruptions for garbage collection, whereas most users would find interruptions lasting for two seconds to be annoying.

The cycle may therefore be divided up among a plurality of collector intervals. When a collection cycle is divided up among a plurality of collection intervals, it is only after a number of intervals that the collector will have followed all reference chains and be able to identify as garbage any objects not thereby reached. This approach is more complex than completing the cycle in a single collection interval; the mutator will usually modify references between collection intervals, so the collector must repeatedly update its view of the reference graph in the midst of the collection cycle. To make such updates practical, the mutator must communicate with the collector to let it know what reference changes are made between intervals.

An even more complex approach, which some systems use to eliminate discrete pauses or maximize resource-use efficiency, is to execute the mutator and collector in concurrent execution threads. Most systems that use this approach use it for most but not all of the collection cycle; the mutator is usually interrupted for a short collector interval, in which a part of the collector cycle takes place without mutation.

Independent of whether the collection cycle is performed concurrently with mutator operation, is completed in a single interval, or extends over multiple intervals is the question of whether the cycle is complete, as has tacitly been assumed so far, or is instead "space-incremental." In space-incremental collection, a collection cycle constitutes only an increment of collection: the collector does not follow all reference chains from the basic root set completely. Instead, it concentrates on only a portion, or collection set, of the heap. Specifically, it identifies every collection-set object referred to by a reference chain that extends into the collection set from outside of it, and it reclaims the collection-set space not occupied by such objects, possibly after evacuating such objects so that the collection-set space they previously occupied can be reclaimed with the space that recognizedly unreachable objects occupy.

By thus culling objects referenced by reference chains that do not necessarily originate in the basic root set, the collector can be thought of as expanding the root set to include as roots some locations that may not be reachable. Although space-incremental collection thereby leaves "floating garbage," it can result in relatively low pause times even if entire collection increments are completed during respective single collection intervals.

Most collectors that employ space-incremental collection operate in "generations" although this is not necessary in principle. Different portions, or generations, of the heap are subject to different collection policies. New objects are allocated in a "young" generation, and young-generation objects that have remained reachable are eventually "promoted" from younger generations to older or more "mature" generations. Collecting the younger generations more frequently than the others yields greater efficiency because the younger generations tend to accumulate garbage faster; newly allocated objects tend to "die," while older objects tend to "survive."

But generational collection greatly increases what is effectively the root set for a given generation. Consider FIG. 6, which depicts a heap as organized into three generations 58, 60, and 62. Assume that generation 60 is to be collected. The process for this individual generation may be more or less the same as that described in connection with FIGS. 4 and 5 for the entire heap, with one major exception. In the case of a single generation, the root set must be considered to include not only the call stack, registers, and global variables represented by set 52 but also objects in the other generations 58 and 62, which themselves may contain references to objects in generation 60. So pointers must be traced not only from the basic root set 52 but also from objects within the other generations.

One could perform this tracing by simply inspecting all references in all other generations at the beginning of every collection interval, and it turns out that this approach is actually feasible in some situations. But it takes too long in other situations, so workers in this field have employed a number of approaches to expediting reference tracing. One approach is to include so-called write barriers in the mutator process. A write barrier is code added to a write operation to record information from which the collector can determine where references were written or may have been since the last collection interval. A reference list can then be maintained by taking such a list as it existed at the end of the previous collection interval and updating it by inspecting only locations identified by the write barrier as possibly modified since the last collection interval.

One of the many write-barrier implementations commonly used by workers in this art employs what has been referred to as the "card table." FIG. 6 depicts the various generations as being divided into smaller sections, known for this purpose as "cards." Card tables 64, 66, and 68 associated with respective generations contain an entry for each of their cards. When the mutator writes a reference in a card, it makes an appropriate entry in the card-table location associated with that card (or, say, with the card in which the object containing the reference begins). Most write-barrier implementations simply make a Boolean entry indicating that the write operation has been performed, although some may be more elaborate. The mutator having thus left a record of where new or modified references may be, the collector can thereafter prepare appropriate summaries of that information, as will be explained in due course. For the sake of concreteness, we will assume that the summaries are maintained by steps that occur principally at the beginning of each collection interval.

Of course, there are other write-barrier approaches, such as simply having the write barrier add to a list of addresses where references were written. Also, although there is no reason in principle to favor any particular number of generations, and, although FIG. 6 shows three, most generational garbage collectors use only two generations, of which one is the young generation and the other is the mature generation. Moreover, although FIG. 6 shows the generations as being of the same size, a more-typical configuration is for the young generation to be considerably smaller. Finally, although we assumed for the sake of simplicity that collection during a given interval was limited to only one generation, a more-typical approach is actually to collect the whole young generation at every interval but to collect the mature one less frequently.

Some collectors collect the entire young generation in every interval and may thereafter perform mature-generation collection in the same interval. It may therefore take relatively little time to scan all young-generation objects remaining after young-generation collection to find references into the mature generation. Even when such collectors do use card tables, therefore, they often do not use them for finding young-generation references that refer to mature-generation objects. On the other hand, laboriously scanning the entire mature generation for references to young-generation (or mature-generation) objects would ordinarily take too long, so the collector uses the card table to limit the amount of memory it searches for mature-generation references.

Now, although it typically takes very little time to collect the young generation, it may take more time than is acceptable within a single garbage-collection interval to collect the entire mature generation. So some garbage collectors may collect the mature generation space-incrementally; that is, they may perform only a part of the mature generation's collection during any particular collection cycle. Space-incremental collection presents the problem that, since the generation's unreachable objects outside the "collection set" of objects processed during that cycle cannot be recognized as unreachable, collection-set objects to which they refer tend not to be, either.

There are many way to reduce the adverse effect this would otherwise have on collection efficiency. For example, commonly assigned copending U.S. patent application Ser. No. 10/799,049, which was filed on Mar. 12, 2004, by Detlefs et al. for Garbage-First Garbage Collection, describes an approach in which the results of a heap-wide marking performed largely concurrently with mutator operation are used to help identify as unreachable some objects that, since they are referred to from outside the collection set, would otherwise be considered potentially reachable.

For the sake of example, though, we will consider in some detail another approach. FIG. 7 depicts this approach, which is often referred to as the "train algorithm." A generation to be collected space-incrementally is divided into sections, which for reasons about to be described are referred to as "car sections." Conventionally, a generation's space-incremental collection occurs in fixed-size sections, and a car section's size is that of the generation portion to be collected during one cycle.

The discussion that follows will occasionally employ the nomenclature in the literature by using the term car instead of car section. But the literature seems to use that term to refer variously not only to memory sections themselves but also to data structures that the train algorithm employs to manage them when they contain objects, as well as to the more-abstract concept that the car section and managing data structure represent in discussions of the algorithm. So the following discussion will more frequently use the expression car section to emphasize the actual sections of memory space for whose management the car concept is employed.

For reasons that will become apparent in due course, the train algorithm groups car sections into "trains," which are ordered, conventionally according to age. For example, FIG. 7 shows an oldest train 73 consisting of a generation 74's three car sections described by associated data structures 75, 76, and 78, while a second train 80 consists only of a single car section, represented by structure 82, and the youngest train 84 (referred to as the "allocation train") consists of car sections that data structures 86 and 88 represent. As will be seen below, car sections' train memberships can change, and any car section added to a train is typically added to the end of a train.

Conventionally, the car collected in an increment is the one added earliest to the oldest train, which in this case is car 75. All of the generation's cars can thus be thought of as waiting for collection in a single long line, in which cars are ordered in accordance with the order of the trains to which they belong and, within trains, in accordance with the order in which they were added to those trains.

As is usual, the way in which reachable objects are identified is to determine whether there are references to them in the root set or in any other object already determined to be reachable. In accordance with the train algorithm, the collector additionally performs a test to determine whether there are any references at all from outside the oldest train to objects within it. If there are not, then all cars within the train can be reclaimed, even though not all of those cars are in the collection set. This tends to reduce the amount of floating garbage because, as will now be explained, the train algorithm so operates that inter-car references tend to be grouped into trains.

The train algorithm is like some other approaches to space-incremental collection in that its implementations typically employ "remembered sets" to identify references into the car from outside of it. As card tables do, remembered sets keep track of references. Whereas a card-table entry contains information about references that the associated card contains, though, a remembered set associated with a given region contains information about references into that region from locations outside of it. In the case of the train algorithm, remembered sets are associated with car sections. Each remembered set, such as car 75's remembered set 90, lists locations in the generation that contain references into the associated car section.

The remembered sets for all of a generation's cars are typically updated at the start of each collection interval. To illustrate how such updating and other collection operations may be carried out, FIG. 8 depicts an operational sequence in a system of the typical type mentioned above. That is, it shows a sequence of operations that may occur in a system in which the entire garbage-collected heap is divided into two generations, namely, a young generation and an old generation, and in which the young generation is much smaller than the old generation. FIG. 8 is also based on the assumption and that the train algorithm is used only for collecting the old generation.

Block 102 represents a period of the mutator's operation. As was explained above, the mutator makes a card-table entry to identify any card that it has "dirtied" by adding or modifying a reference that the card contains. At some point, the mutator will be interrupted for collector operation. Different implementations employ different events to trigger such an interruption, but we will assume for the sake of concreteness that the system's dynamic-allocation routine causes such interruptions when no room is left in the young generation for any further allocation. A dashed line 103 represents the transition from mutator operation and collector operation.

In the system assumed for the FIG. 8 example, the collector collects the (entire) young generation each time such an interruption occurs. When the young generation's collection ends, the mutator operation usually resumes, without the collector's having collected any part of the old generation. Once in a while, though, the collector also collects part of the old generation, and FIG. 8 is intended to illustrate such an occasion.

When the collector's interval first starts, it first processes the card table, in an operation that block 104 represents. As was mentioned above, the collector scans the "dirtied" cards for references into the young generation. If a reference is found, that fact is memorialized appropriately. If the reference refers to a young-generation object, for example, an expanded card table may be used for this purpose. For each card, such an expanded card table might include a multi-byte array used to summarize the card's reference contents. The summary may, for instance, be a list of offsets that indicate the exact locations within the card of references to young-generation objects, or it may be a list of fine-granularity "sub-cards" within which references to young-generation objects may be found. If the reference refers to an old-generation object, the collector often adds an entry to the remembered set associated with the car containing that old-generation object. The entry identifies the reference's location, or at least a small region in which the reference can be found. For reasons that will become apparent, though, the collector will typically not bother to place in the remembered set the locations of references from objects in car sections farther forward in the collection queue than the referred-to object, i.e., from objects in older trains or in cars added earlier to the same train.

The collector then collects the young generation, as block 105 indicates. (Actually, young-generation collection may be interleaved with the dirty-region scanning, but the drawing illustrates it for purpose of explanation as being separate.) If a young-generation object is referred to by a reference that card-table scanning has revealed, that object is considered to be potentially reachable, as is any young-generation object referred to by a reference in the root set or in another reachable young-generation object. The space occupied by any young-generation object thus considered reachable is withheld from reclamation. For example, it may be evacuated to a young-generation semi-space that will be used for allocation during the next mutator interval. It may instead be promoted into the older generation, where it is placed into a car containing a reference to it or into a car in the last train. Or some other technique may be used to keep the memory space it occupies off the system's free list. The collector then reclaims any young-generation space occupied by any other objects, i.e., by any young-generation objects not identified as transitively reachable through references located outside the young generation.

The collector then performs the train algorithm's central test, referred to above, of determining whether there are any references into the oldest train from outside of it. As was mentioned above, the actual process of determining, for each object, whether it can be identified as unreachable is performed for only a single car section in any cycle. In the absence of features such as those provided by the train algorithm, this would present a problem, because garbage structures may be larger than a car section. Objects in such structures would therefore (erroneously) appear reachable, since they are referred to from outside the car section under consideration. But the train algorithm additionally keeps track of whether there are any references into a given car from outside the train to which it belongs, and trains' sizes are not limited. As will be apparent presently, objects not found to be unreachable are relocated in such a way that garbage structures tend to be gathered into respective trains into which, eventually, no references from outside the train point. If no references from outside the train point to any objects inside the train, the train can be recognized as containing only garbage. This is the test that block 106 represents. All space occupied by cars belonging to a train thus identified as containing only garbage can be reclaimed.

The question of whether old-generation references point into the train from outside of it is (conservatively) answered in the course of updating remembered sets; in the course of updating a car's remembered set, it is a simple matter to flag the car as being referred to from outside the train. The step-106 test additionally involves determining whether any references from outside the old generation point into the oldest train. Various approaches to making this determination have been suggested, including the conceptually simple approach of merely following all reference chains from the root set until those chains (1) terminate, (2) reach an old-generation object outside the oldest train, or (3) reach an object in the oldest train. In the two-generation example, most of this work can be done readily by identifying references into the collection set from reachable young-generation objects during the young-generation collection. If one or more such chains reach the oldest train, that train includes reachable objects. It may also include reachable objects if the remembered-set-update operation has found one or more references into the oldest train from outside of it. Otherwise, that train contains only garbage, and the collector reclaims all of its car sections for reuse, as block 107 indicates. The collector may then return control to the mutator, which resumes execution, as FIG. 8B's block 108 indicates.

If the train contains reachable objects, on the other hand, the collector turns to evacuating potentially reachable objects from the collection set. The first operation, which block 110 represents, is to remove from the collection set any object that is reachable from the root set by way of a reference chain that does not pass through the part of the old generation that is outside of the collection set. In the illustrated arrangement, in which there are only two generations, and the young generation has previously been completely collected during the same interval, this means evacuating from a collection set any object that (1) is directly referred to by a reference in the root set, (2) is directly referred to by a reference in the young generation (in which no remaining objects have been found unreachable), or (3) is referred to by any reference in an object thereby evacuated. All of the objects thus evacuated are placed in cars in the youngest train, which was newly created during the collection cycle. Certain of the mechanics involved in the evacuation process are described in more detail in connection with similar evacuation performed, as blocks 112 and 114 indicate, in response to remembered-set entries.

FIG. 9 illustrates how the processing represented by block 114 proceeds. The entries identify heap regions, and, as block 116 indicates, the collector scans the thus-identified heap regions to find references to locations in the collection-set. As blocks 118 and 120 indicate, that entry's processing continues until the collector finds no more such references. Every time the collector does find such a reference, it checks to determine whether, as a result of a previous entry's processing, the referred-to object has already been evacuated. If it has not, the collector evacuates the referred-to object to a (possibly new) car in the train containing the reference, as blocks 122 and 124 indicate.

As FIG. 10 indicates, the evacuation operation includes more than just object relocation, which block 126 represents. Once the object has been moved, the collector places a forwarding pointer in the collection-set location from which it was evacuated, for a purpose that will become apparent presently. Block 128 represents that step. (Actually, there are some cases in which the evacuation is only a "logical" evacuation: the car containing the object is simply re-linked to a different logical place in the collection sequence, but its address does not change. In such cases, forwarding pointers are unnecessary.) Additionally, the reference in response to which the object was evacuated is updated to point to the evacuated object's new location, as block 130 indicates. And, as block 132 indicates, any reference contained in the evacuated object is processed, in an operation that FIGS. 11A and 11B (together, "FIG. 11") depict.

For each one of the evacuated object's references, the collector checks to see whether the location that it refers to is in the collection set. As blocks 134 and 136 indicate, the reference processing continues until all references in the evacuated object have been processed. In the meantime, if a reference refers to a collection-set location that contains an object not yet evacuated, the collector evacuates the referred-to object to the train to which the evacuated object containing the reference was evacuated, as blocks 138 and 140 indicate.

If the reference refers to a location in the collection set from which the object has already been evacuated, then the collector uses the forwarding pointer left in that location to update the reference, as block 142 indicates. Before the processing of FIG. 11, the remembered set of the referred-to object's car will have an entry that identifies the evacuated object's old location as one containing a reference to the referred-to object. But the evacuation has placed the reference in a new location, for which the remembered set of the referred-to object's car may not have an entry. So, if that new location is not as far forward as the referred-to object, the collector adds to that remembered set an entry identifying the reference's new region, as blocks 144 and 146 indicate. As the drawings indicate, the remembered set may similarly need to be updated even if the referred-to object is not in the collection set.

Now, some train-algorithm implementations postpone processing of the references contained in evacuated collection-set objects until after all directly reachable collection-set objects have been evacuated. In the implementation that FIG. 10 illustrates, though, the processing of a given evacuated object's references occurs before the next object is evacuated. So FIG. 11's blocks 134 and 148 indicate that the FIG. 11 operation is completed when all of the references contained in the evacuated object have been processed. This completes FIG. 10's object-evacuation operation, which FIG. 9's block 124 represents.

As FIG. 9 indicates, each collection-set object referred to by a reference in a remembered-set-entry-identified location is thus evacuated if it has not been already. If the object has already been evacuated from the referred-to location, the reference to that location is updated to point to the location to which the object has been evacuated. If the remembered set associated with the car containing the evacuated object's new location does not include an entry for the reference's location, it is updated to do so if the car containing the reference is younger than the car containing the evacuated object. Block 150 represents updating the reference and, if necessary, the remembered set.

As FIG. 8's blocks 112 and 114 indicate, this processing of collection-set remembered sets is performed initially only for entries that do not refer to locations in the oldest train. Those that do are processed only after all others have been, as blocks 152 and 154 indicate.

When this process has been completed, the collection set's memory space can be reclaimed, as block 164 indicates, since no remaining object is referred to from outside the collection set: any remaining collection-set object is unreachable. The collector then relinquishes control to the mutator.

FIGS. 12A-12J illustrate results of using the train algorithm. FIG. 12A represents a generation in which objects have been allocated in nine car sections. The oldest train has four cars, numbered 1.1 through 1.4. Car 1.1 has two objects, A and B. There is a reference to object B in the root set (which, as was explained above, includes live objects in the other generations). Object A is referred to by object L, which is in the third train's sole car section. In the generation's remembered sets 170, a reference in object L has therefore been recorded against car 1.1.

Processing always starts with the oldest train's earliest-added car, so the garbage collector refers to car 1.1's remembered set and finds that there is a reference from object L into the car being processed. It accordingly evacuates object A to the train that object L occupies. The object being evacuated is often placed in one of the selected train's existing cars, but we will assume for present purposes that there is not enough room. So the garbage collector evacuates object A into a new car section and updates appropriate data structures to identify it as the next car in the third train. FIG. 12B depicts the result: a new car has been added to the third train, and object A is placed in it.

FIG. 12B also shows that object B has been evacuated to a new car outside the first train. This is because object B has an external reference, which, like the reference to object A, is a reference from outside the first train, and one goal of the processing is to form trains into which there are no further references. Note that, to maintain a reference to the same object, object L's reference to object A has had to be rewritten, and so have object B's reference to object A and the inter-generational pointer to object B. In the illustrated example, the garbage collector begins a new train for the car into which object B is evacuated, but this is not a necessary requirement of the train algorithm. That algorithm requires only that externally referenced objects be evacuated to a newer train.

Since car 1.1 no longer contains live objects, it can be reclaimed, as FIG. 12B also indicates. Also note that the remembered set for car 2.1 now includes the address of a reference in object A, whereas it did not before. As was stated before, remembered sets in the illustrated embodiment include only references from cars further back in the order than the one with which the remembered set is associated. The reason for this is that any other cars will already be reclaimed by the time the car associated with that remembered set is processed, so there is no reason to keep track of references from them.

The next step is to process the next car, the one whose index is 1.2. Conventionally, this would not occur until some collection cycle after the one during which car 1.1 is collected. For the sake of simplicity we will assume that the mutator has not changed any references into the generation in the interim.

FIG. 12B depicts car 1.2 as containing only a single object, object C, and that car's remembered set contains the address of an inter-car reference from object F. The garbage collector follows that reference to object C. Since this identifies object C as possibly reachable, the garbage collector evacuates it from car set 1.2, which is to be reclaimed. Specifically, the garbage collector removes object C to a new car section, section 1.5, which is linked to the train to which the referring object F's car belongs. Of course, object F's reference needs to be updated to object C's new location. FIG. 12C depicts the evacuation's result.

FIG. 12C also indicates that car set 1.2 has been reclaimed, and car 1.3 is next to be processed. The only address in car 1.3's remembered set is that of a reference in object G. Inspection of that reference reveals that it refers to object F. Object F may therefore be reachable, so it must be evacuated before car section 1.3 is reclaimed. On the other hand, there are no references to objects D and E, so they are clearly garbage. FIG. 12D depicts the result of reclaiming car 1.3's space after evacuating possibly reachable object F.

In the state that FIG. 12D depicts, car 1.4 is next to be processed, and its remembered set contains the addresses of references in objects K and C. Inspection of object K's reference reveals that it refers to object H, so object H must be evacuated. Inspection of the other remembered-set entry, the reference in object C, reveals that it refers to object G, so that object is evacuated, too. As FIG. 12E illustrates, object H must be added to the second train, to which its referring object K belongs. In this case there is room enough in car 2.2, which its referring object K occupies, so evacuation of object H does not require that object K's reference to object H be added to car 2.2's remembered set. Object G is evacuated to a new car in the same train, since that train is where referring object C resides. And the address of the reference in object G to object C is added to car 1.5's remembered set.

FIG. 12E shows that this processing has eliminated all references into the first train, and it is an important part of the train algorithm to test for this condition. That is, even though there are references into both of the train's cars, those cars' contents can be recognized as all garbage because there are no references into the train from outside of it. So all of the first train's cars are reclaimed.

The collector accordingly processes car 2.1 during the next collection cycle, and that car's remembered set indicates that there are two references outside the car that refer to objects within it. Those references are in object K, which is in the same train, and object A, which is not. Inspection of those references reveals that they refer to objects I and J, which are evacuated.

The result, depicted in FIG. 12F, is that the remembered sets for the cars in the second train reveal no inter-car references, and there are no inter-generational references into it, either. That train's car sections therefore contain only garbage, and their memory space can be reclaimed.

So car 3.1 is processed next. Its sole object, object L, is referred to inter-generationally as well as by a reference in the fourth train's object M. As FIG. 12G shows, object L is therefore evacuated to the fourth train. And the address of the reference in object L to object A is placed in the remembered set associated with car 3.2, in which object A resides.

The next car to be processed is car 3.2, whose remembered set includes the addresses of references into it from objects B and L. Inspection of the reference from object B reveals that it refers to object A, which must therefore be evacuated to the fifth train before car 3.2 can be reclaimed. Also, we assume that object A cannot fit in car section 5.1, so a new car 5.2 is added to that train, as FIG. 12H shows, and object A is placed in its car section. All referred-to objects in the third train having been evacuated, that (single-car) train can be reclaimed in its entirety.

A further observation needs to be made before we leave FIG. 12G. Car 3.2's remembered set additionally lists a reference in object L, so the garbage collector inspects that reference and finds that it points to the location previously occupied by object A. This brings up a feature of copying-collection techniques such as the typical train-algorithm implementation. When the garbage collector evacuates an object from a car section, it marks the location as having been evacuated and leaves the address of the object's new location. So, when the garbage collector traces the reference from object L, it finds that object A has been removed, and it accordingly copies the new location into object L as the new value of its reference to object A.

In the state that FIG. 12H illustrates, car 4.1 is the next to be processed. Inspection of the fourth train's remembered sets reveals no inter-train references into it, but the inter-generational scan (possibly performed with the aid of FIG. 6's card tables) reveals inter-generational references into car 4.2. So the fourth train cannot be reclaimed yet. The garbage collector accordingly evacuates car 4.1's referred-to objects in the normal manner, with the result that FIG. 12I depicts.

In that state, only inter-generational references refer to objects in the next car to be processed. So, although its referred-to objects must therefore be evacuated from the train, they cannot be placed into trains that contain references to them. Conventionally, such objects are evacuated to a train at the end of the train sequence. In the illustrated implementation, a new train is formed for this purpose, so the result of car 4.2's processing is the state that FIG. 12J depicts.

Processing continues in this same fashion. Of course, subsequent collection cycles will not in general proceed, as in the illustrated cycles, without any reference changes by the mutator and without any addition of further objects. But reflection reveals that the general approach just described still applies when such mutations occur.

The following embodiment employs a way of implementing the train algorithm that is in general terms similar to the way described above. But, whereas it was tacitly assumed above that, as is conventional, only a single car section would be collected in any given collection interval, the embodiment now to be discussed may collect more than a single car during a collection interval. FIGS. 13A and 13B (together, "FIG. 13") therefore depict a collection operation that is similar to the one that FIG. 8 depicts, but FIG. 13 reflects the possibility of multiple-car collection sets and depicts certain optimizations.

Blocks 172, 176, and 178 represent operations that correspond to those that FIG. 8's blocks 102, 104, and 105 do, and dashed line 174 represents the passage of control from the mutator to the collector, as FIG. 8's dashed line 103 does. For the sake of efficiency, though, the collection operation of FIG. 13 includes a step represented by block 180. In this step, the collector reads the remembered set of each car in the collection set to determine the location of each reference into the collection set from a car outside of it, it places the address of each reference thereby found into a scratch-pad list associated with the train that contains that reference, and it places the scratch-pad lists in reverse-train order. As blocks 182 and 184 indicate, it then processes the entries in all scratch-pad lists but the one associated with the oldest train.

Before the collector processes references in that train's scratch-pad list, the collector evacuates any objects referred to from outside the old generation, as block 186 indicates. To identify such objects, the collector scans the root set. In some generational collectors, it may also have to scan other generations for references into the collection set. For the sake of example, though, we have assumed the particularly common scheme in which a generation's collection in a given interval is always preceded in the same interval by complete collection of every younger generation (of which, in this case, there is only one). If, in addition, the collector's promotion policy is to promote all surviving younger-generation objects into older generations, it is necessary only to scan older generations, of which there are none in the example; i.e., some embodiments may not require that the young generation be scanned in the block-186 operation.

For those that do, though, the scanning may actually involve inspecting each surviving object in the young generation, or the collector may expedite the process by using card-table entries. Regardless of which approach it uses, the collector immediately evacuates into another train any collection-set object to which it thereby finds an external reference. The typical policy is to place the evacuated object into the youngest such train. As before, the collector does not attempt to evacuate an object that has already been evacuated. When it does evacuate an object to a train, it additionally evacuates to the same train each collection-set object to which a reference in the thus-evacuated object refers. In any case, the collector updates the reference to the evacuated object.

When the inter-generational references into the generation have thus been processed, the garbage collector determines whether there are any references into the oldest train from outside that train. If there are none, the entire train can be reclaimed, as blocks 188 and 190 indicate.

As block 192 indicates, the collector interval typically ends when a train has thus been collected. If the oldest train cannot be collected in this manner, though, the collector proceeds to evacuate any collection-set objects referred to by references whose locations the oldest train's scratch-pad list includes, as blocks 194 and 196 indicate. It removes them to younger cars in the oldest train, again updating references, avoiding duplicate evacuations, and evacuating any collection-set objects to which the evacuated objects refer. When this process has been completed, the collection set can be reclaimed, as block 198 indicates, since no remaining object is referred to from outside the collection set: any remaining collection-set object is unreachable. The collector then relinquishes control to the mutator.

As was explained above, most train-algorithm implementations maintain for each train a set of information by which the collector can readily determine whether any references located outside the train refer to locations within the train. If the collector infers from this information that there are no such references into the train, then the train's memory space can be reclaimed without inspecting all of the locations that all of the train's remembered sets identify. My commonly assigned copending U.S. patent application Ser. No. 10/313, 878 for Detection of Dead Regions During Incremental Collection, which was filed on Dec. 6, 2002, and is hereby incorporated by reference, extends that concept. It describes techniques for identifying individual cars whose memory space can similarly be reclaimed without laboriously processing their entire remembered sets.

The general approach employed there is to maintain a "youngest-car indicator" and an "oldest-car indicator" for each car. Together these indicators define a maximum car range outside which it can be guaranteed that no references to the associated car are located. During a collection increment, the collector marks as potentially reachable all the cars in the generation that are identified as containing locations referred from outside the generation. It also marks as potentially reachable any car whose car range includes a potentially reachable car. Cars that are not thereby found to be reachable can be recognized as dead and their memory space reclaimed without the need to inspect the locations that their remembered sets identify. Cars thus identified as dead will often be collected before "older" cars, i.e., before cars that are ahead of them in the nominal collection order.

We now turn to a problem presented by popular objects. FIG. 12F shows that there are two references to object L after the second train is collected. So references in both of the referring objects need to be updated when object L is evacuated. If entry duplication is to be avoided, adding remembered-set entries is burdensome. Still, the burden in not too great in that example, since only two referring objects are involved. But some types of applications routinely generate objects to which there are large numbers of references. Evacuating a single one of these objects requires considerable reference updating, so it can be quite costly.

One way of dealing with this problem is to place popular objects in their own cars. To understand how this can be done, consider FIG. 14's exemplary data structures, which represent the type of information a collector may maintain in support of the train algorithm. To emphasize trains' ordered nature, FIG. 14 depicts such a structure 244 as including pointers 245 and 246 to the previous and next trains, although train order could obviously be maintained without such a mechanism. Cars are ordered within trains, too, and it may be a convenient to assign numbers for this purpose explicitly and keep the next number to be assigned in the train-associated structure, as field 247 suggests. In any event, some way of associating cars with trains is necessary, and the drawing represents this by fields 248 and 249 that point to structures containing data for the train's first and last cars.

FIG. 14 depicts one such structure 250 as including pointers 251, 252, and 253 to structures that contain information concerning the train to which the car belongs, the previous car in the train, and the next car in the train. Further pointers 254 and 255 point to the locations in the heap at which the associated car section begins and ends, whereas pointer 256 points to the place at which the next object can be added to the car section.

As will be explained in more detail presently, there is a standard car-section size that is used for all cars that contain more than one object, and that size is great enough to contain a relatively large number of average-sized objects. But some objects can be too big for the standard size, so a car section may consist of more than one of the standard-size memory sections. Structure 250 therefore includes a field 257 that indicates how many standard-size memory sections there are in the car section that the structure manages.

On the other hand, that structure may in the illustrated embodiment be associated not with a single car section but rather with a standard-car-section-sized memory section that contains more than one (special-size) car section. When an organization of this type is used, structures like structure 250 may include a field 258 that indicates whether the heap space associated with the structure is used (1) normally, as a car section that can contain multiple objects, or (2) specially, as a region in which objects are stored one to a car in a manner that will now be explained by reference to the additional structures that FIG. 15 illustrates.

To deal specially with popular objects, the garbage collector may keep track of the number of references there are to each object in the generation being collected. Now, the memory space 260 allocated to an object typically begins with a header 262 that contains various housekeeping information, such as an identifier of the class to which the object belongs. One way to keep track of an object's popularity is for the header to include a reference-count field 264 right in the object's header. That field's default value is zero, which is its value at the beginning of the remembered-set processing in a collection cycle in which the object belongs to the collection set. As the garbage collector processes the collection-set cars' remembered sets, it increments the object's reference-count field each time it finds a reference to that object, and it tests the resultant value to determine whether the count exceeds a predetermined popular-object threshold. If the count does exceed the threshold, the collector removes the object to a "popular side yard" if it has not done so already.

Specifically, the collector consults a table 266, which points to linked lists of normal-car-section-sized regions intended to contain popular objects. Preferably, the normal car-section size is considerably larger than the 30 to 60 bytes that has been shown by studies to be an average object size in typical programs. Under such circumstances, it would be a significant waste of space to allocate a whole normal-sized car section to an individual object. For reasons that will become apparent below, collectors may tend to place popular objects into their own, single-object car sections. So the normal-car-section-sized regions to which table 266 points are to be treated as specially divided into car sections whose sizes are more appropriate to individual-object storage.

To this end, table 266 includes a list of pointers to linked lists of structures associated with respective regions of that type. Each list is associated with a different object-size range. For example, consider the linked list pointed to by table 266's section pointer 268. Pointer 268 is associated with a linked list of normal-car-sized regions organized into n-card car sections. Structure 267 is associated with one such region and includes fields 270 and 272 that point to the previous and next structure in a linked list of such structures associated with respective regions of n-card car sections. Car-section region 269, with which structure 267 is associated, is divided into n-card car sections such as section 274, which contains object 260.

More specifically, the garbage collector determines the size of the newly popular object by, for instance, consulting the class structure to which one of its header entries points. It then determines the smallest popular-car-section size that can contain the object. Having thus identified the appropriate size, it follows table 266's pointer associated with that size to the list of structures associated with regions so divided. It follows the list to the first structure associated with a region that has constituent car sections left.

Let us suppose that the first such structure is structure 267. In that case, the collector finds the next free car section by following pointer 276 to a car data structure 278. This data structure is similar to FIG. 14's structure 250, but in the illustrated embodiment it is located in the garbage-collected heap, at the end of the car section with which it is associated. In a structure-278 field similar to structure 250's field 279, the collector places the next car number of the train to which the object is to be assigned, and it places the train's number in a field corresponding to structure 250's field 251. The collector also stores the object at the start of the popular-object car section in which structure 278 is located. In short, the collector is adding a new car to the object's train, but the associated car section is a smaller-than-usual car section, sized to contain the newly popular object efficiently.

The aspect of the illustrated embodiment's data-structure organization that FIGS. 14 and 15 depict provides for special-size car sections without detracting from rapid identification of the normal-sized car to which a given object belongs. Conventionally, all car sections have been the same size, because doing so facilitates rapid car identification. Typically, for example, the most-significant bits of the difference between the generation's base address and an object's address are used as an offset into a car-metadata table, which contains pointers to car structures associated with the (necessarily uniform-size) memory sections associated with those most-significant bits. FIGS. 14 and 15's organization permits this general approach to be used while providing at the same time for special-sized car sections. The car-metadata table can be used as before to contain pointers to structures associated with memory sections whose uniform size is dictated by the number of address bits used as an index into that table.

In the illustrated embodiment, though, the structures pointed to by the metadata-table pointers contain fields exemplified by fields 258 of FIG. 14's structure 250 and FIG. 15's structure 267. These fields indicate whether the structure manages only a single car section, as structure 250 does. If so, the structure thereby found is the car structure for that object. Otherwise, the collector infers from the object's address and the structure's section_size field 284 the location of the car structure, such as structure 278, that manages the object's special-size car section, and it reads the object's car number from that structure. This inference is readily drawn if every such car structure is positioned at the same offset from one of its respective car section's boundaries. In the illustrated example, for instance, every such car section's car structure is placed at the end of the car section, so its train and car-number fields are known to be located at predetermined offsets from the end of the car section.

It will be apparent from the description above that among the tasks of automatic garbage collection, by embodiments of the train algorithm described, may be scanning of objects, and recording of data related to the objects. These tasks may take place, for example, in the embodiments described, when objects are evacuated to younger cars or trains. The tasks may also be desirable at other times in the execution of those embodiments that will be apparent to one of ordinary skill in the art, and it will be apparent to one of ordinary skill in the art that these tasks also may be desirable in other embodiments of the train algorithm or in other garbage collection methodologies. It thus would be useful to improve the efficiency of scanning, such as scanning the evacuated objects, and recording, such as when updating references. It also will be apparent to one of ordinary skill in the art that techniques for improving the efficiency of scanning and recording that have application to these procedures may also be of more general utility in the processing of data objects in computer systems generally.

It is among the objects of the methodologies disclosed herein to provide such improvements in evacuating, scanning and/or recording data.

SUMMARY OF THE INVENTION

In accordance with the principles of the invention, a method and system for employing a computer system including memory to execute a program of instructions have been developed, comprising, for a plurality of objects associated with the program and stored in the memory, associating a vtable with the object, the vtable containing a pointer to invoke an operation, related to the object, to be performed by the said program, where the operation to be performed may include the step of modifying the pointer contained in the vtable, such that a subsequent reference to the vtable associated with the object may result in the modified pointer invoking a different operation related to the object to be performed by the program.

In an embodiment of the invention, the method or system may be employed in connection with a garbage collector that treats a generation of a heap in the memory as divided into cars grouped into trains ordered in a nominal collection order and collects in collection increments respective collection sets of those cars in accordance with the train algorithm, where for a plurality of the cars, a vtable is associated with the car, and the vtable contains at least one pointer to invoke an operation related to the car to be performed. The operation to be performed may include the step of modifying the pointer contained in the vtable, such that a subsequent reference to the vtable associated with the car may result in the modified pointer invoking a different operation related to the car to be performed by the program.

The operation to be performed may be a reference processing operation, and in the case of the car being a normal car or a car which contains a formerly-popular object, the pointer to the reference-processing operation may invoke an operation in which an object in said car is copied to another car, and in the case of the car being an oversized car or a car which contains a still-popular object, the pointer to the reference-processing operation may invoke an operation in which the car is relinked. In the case of the operation to be performed being a reference processing operation, where the car is a normal car or a car which contains a formerly-popular object, and another object contains a reference to the said copied object, the pointer to the reference-processing operation may invoke an operation in which the reference in the other object to the said copied object is updated, and in the case of the car being an oversized car or a car which contains a still-popular object, the pointer to the reference-processing operation may invoke an operation in which references in other objects to the said relinked object are not updated.

The operation to be performed may be an insertion operation, and in the case of the car being a normal car, the pointer to the insertion operation may invoke an operation in which an entry is inserted into a remembered set associated with the car, and in the case of the car being a special car which has a predetermined number of entries into a remembered set associated with the car, the pointer to the insertion operation may invoke an operation in which a further entry is not inserted into the remembered set if the further entry relates to an object in a car which car is not younger than all of the cars associated with existing entries in the remembered set, and in the case of the car being a special car which has fewer than the predetermined number of entries into a remembered set associated with the car, the pointer to the insertion operation may invoke an operation in which a further entry is inserted into the remembered set, and in the event that the insertion causes the number of entries in the remembered set to reach the said predetermined number, the operation may modify the pointer contained in the vtable, such that a subsequent reference to the vtable associated with the car may result in the modified pointer invoking the insertion operation in which a further entry is not inserted into the remembered set if the further entry relates to an object in a car which car is not younger than all of the cars associated with existing entries in the remembered set. In the case of the car being a special car which has a predetermined number of entries into a remembered set associated with the car, the pointer to the insertion operation may invoke an operation in which a further entry is inserted into the remembered set if the further entry relates to an object in a car which car is younger than all of the cars associated with existing entries in the remembered set.

The operation to be performed may be a scanning operation, and in the case of the car being a normal car, or a newly-popular car, and an object in the car having been evacuated from the collection set, and the evacuated object containing a reference to another object, the pointer to the scanning operation may invoke an operation in which the reference in the evacuated object is appropriately recorded if it is to an object in an older car and the reference in the evacuated object is appropriately recorded if it is to an object in a younger generation, and in the case of the car being an oversized car or a car which contains a still-popular object, and an object in the car having been evacuated from the collection set, and the evacuated object containing a reference to another object, the pointer to the scanning operation may invoke an operation in which a reference in the evacuated object to an object is appropriately recorded if it is to an object in an older car and a reference in the evacuated object to an object in a younger generation is not recorded. The operation which the pointer to the scanning operation invokes may appropriately record a reference in the evacuated object to an object in an older car by placing an entry in a remembered set of the object in the older car, in all cases or in the event that the remembered set is not of fixed size and full or, if the remembered set is of fixed size and full, if the car which contains the evacuated object is younger than all of the cars with existing entries in the remembered set. If the car is a newly-popular car, the pointer to the scanning operation may invoke an operation which modifies the pointer so that a subsequent reference to the vtable associated with the car will result in the modified pointer invoking the scanning operation for a car with a still-popular object.

BRIEF DESCRIPTION OF THE DRAWINGS

The invention description below refers to the accompanying drawings, of which:

FIGS. 12A-12J, discussed above, are diagrams that illustrate a collection scenario that can result from using the train algorithm;

DETAILED DESCRIPTION OF AN ILLUSTRATIVE EMBODIMENT

Figure 1:
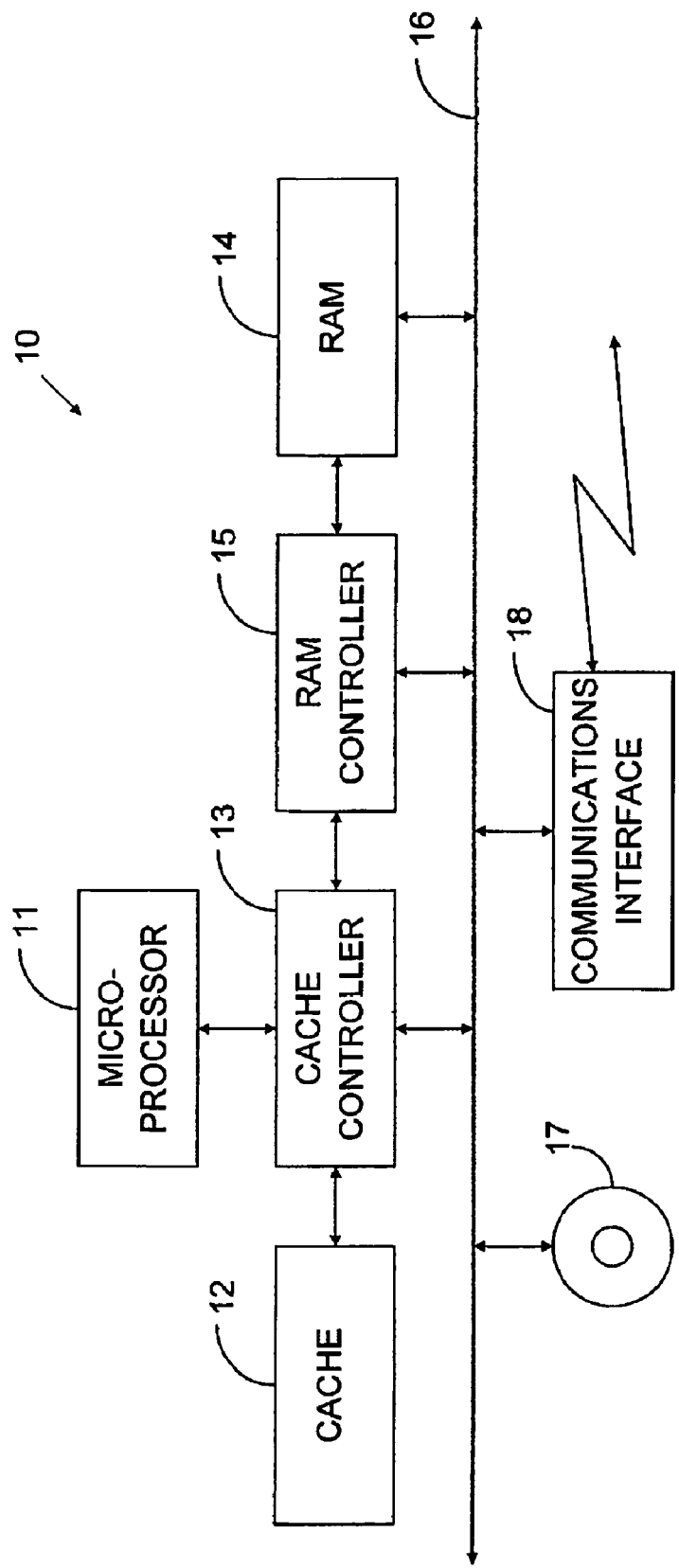
FIG. 1, discussed above, is a block diagram of a computer system in which the present invention's teachings can be practiced.
Figure 2:
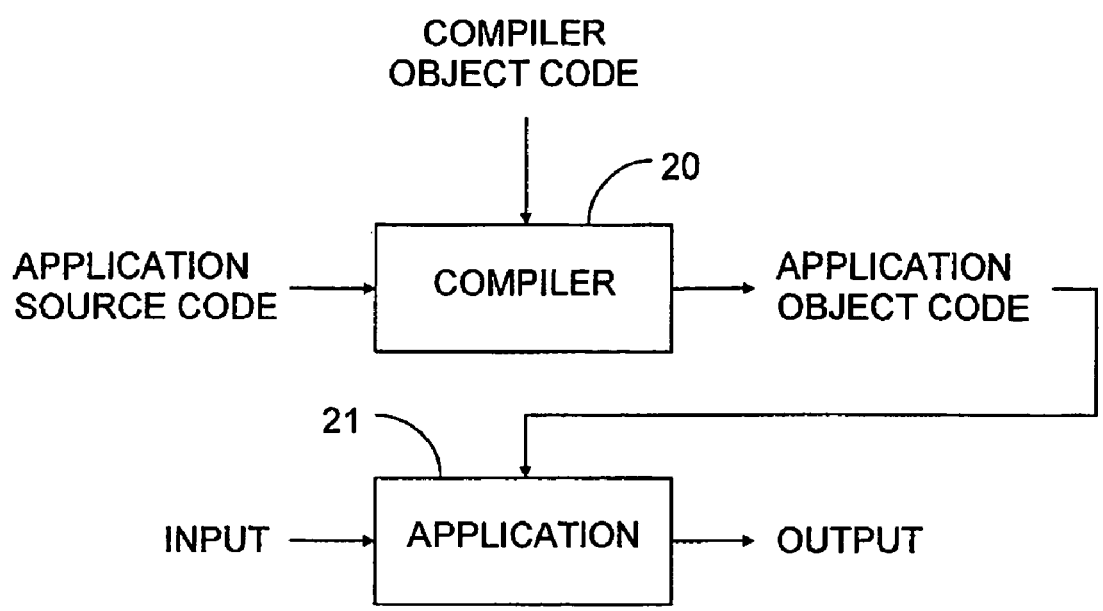
FIG. 2, discussed above, is a block diagram that illustrates a compiler's basic functions.
Figure 3:
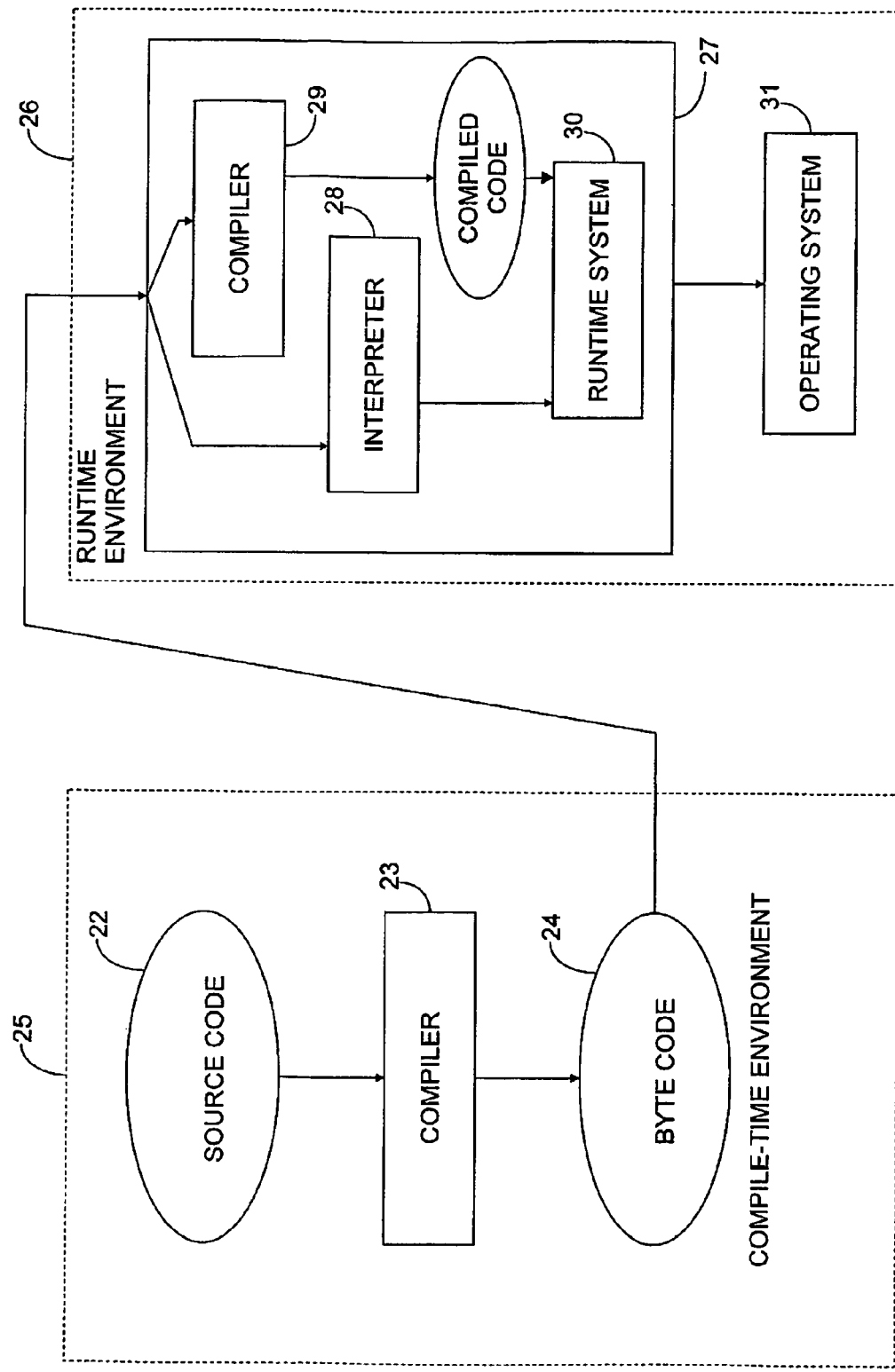
FIG. 3, discussed above, is a block diagram that illustrates a more-complicated compiler/interpreter organization.
Figure 4:
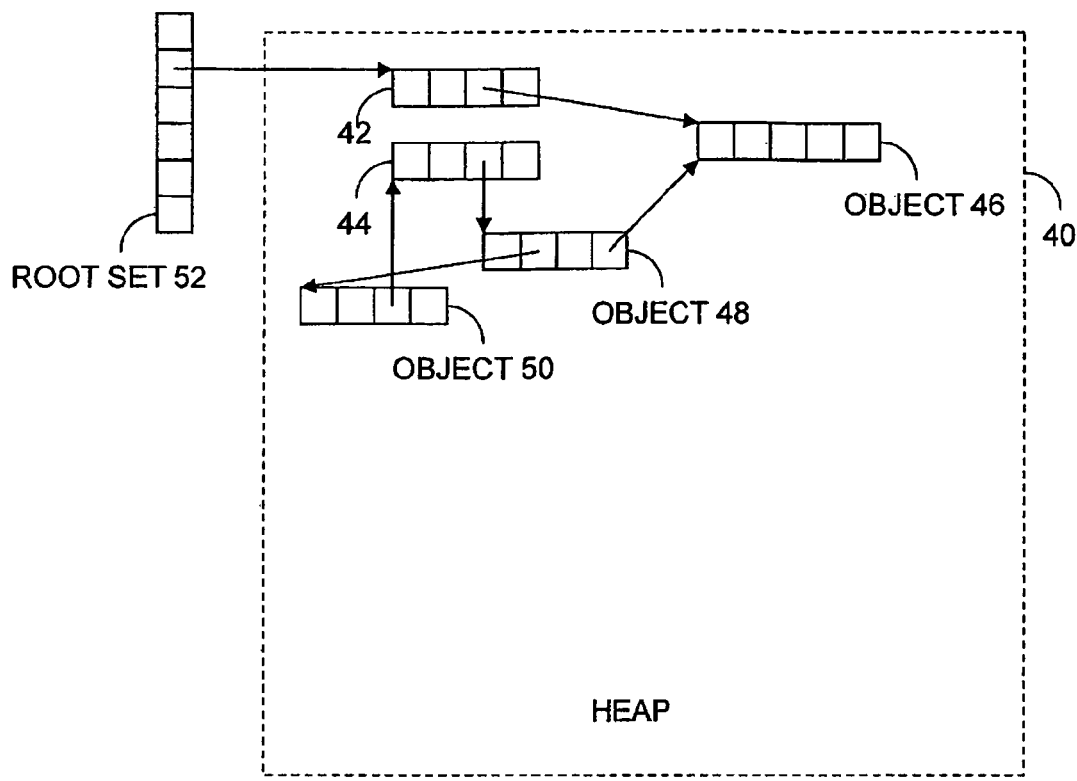
FIG. 4, discussed above, is a diagram that illustrates a basic garbage-collection mechanism.
Figure 5:
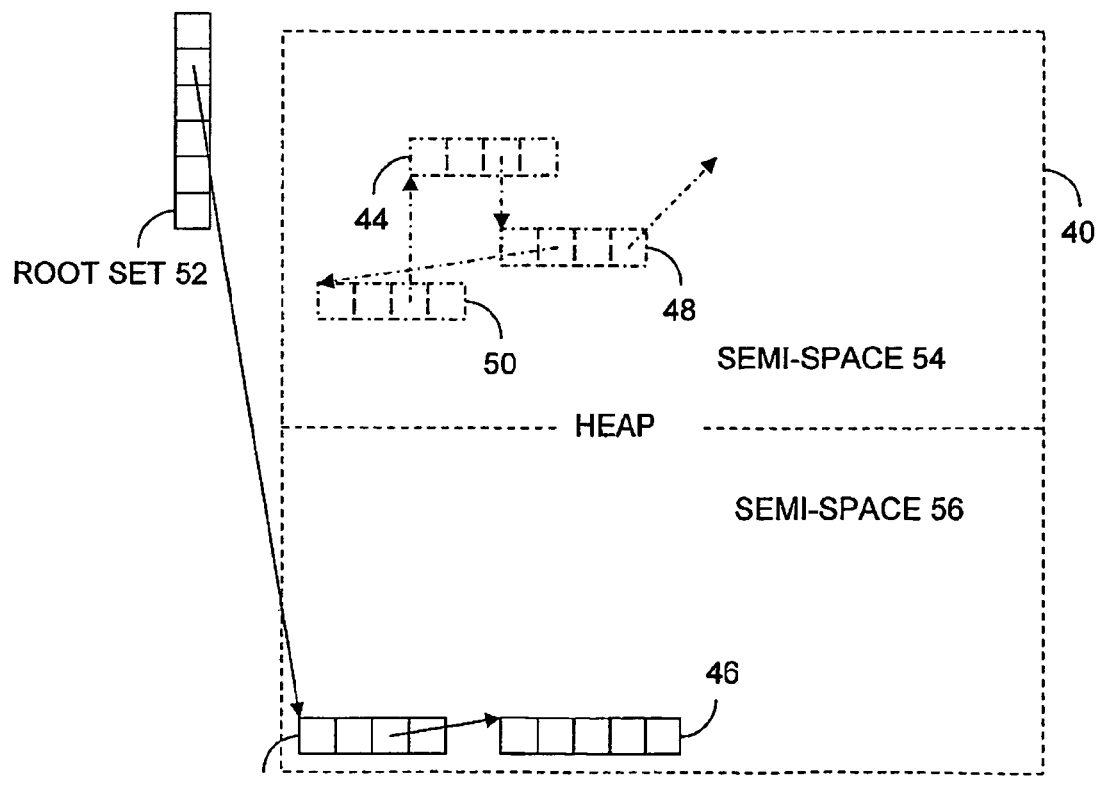
FIG. 5, discussed above, is a similar diagram illustrating that garbage-collection approach's relocation operation.
Figure 6:
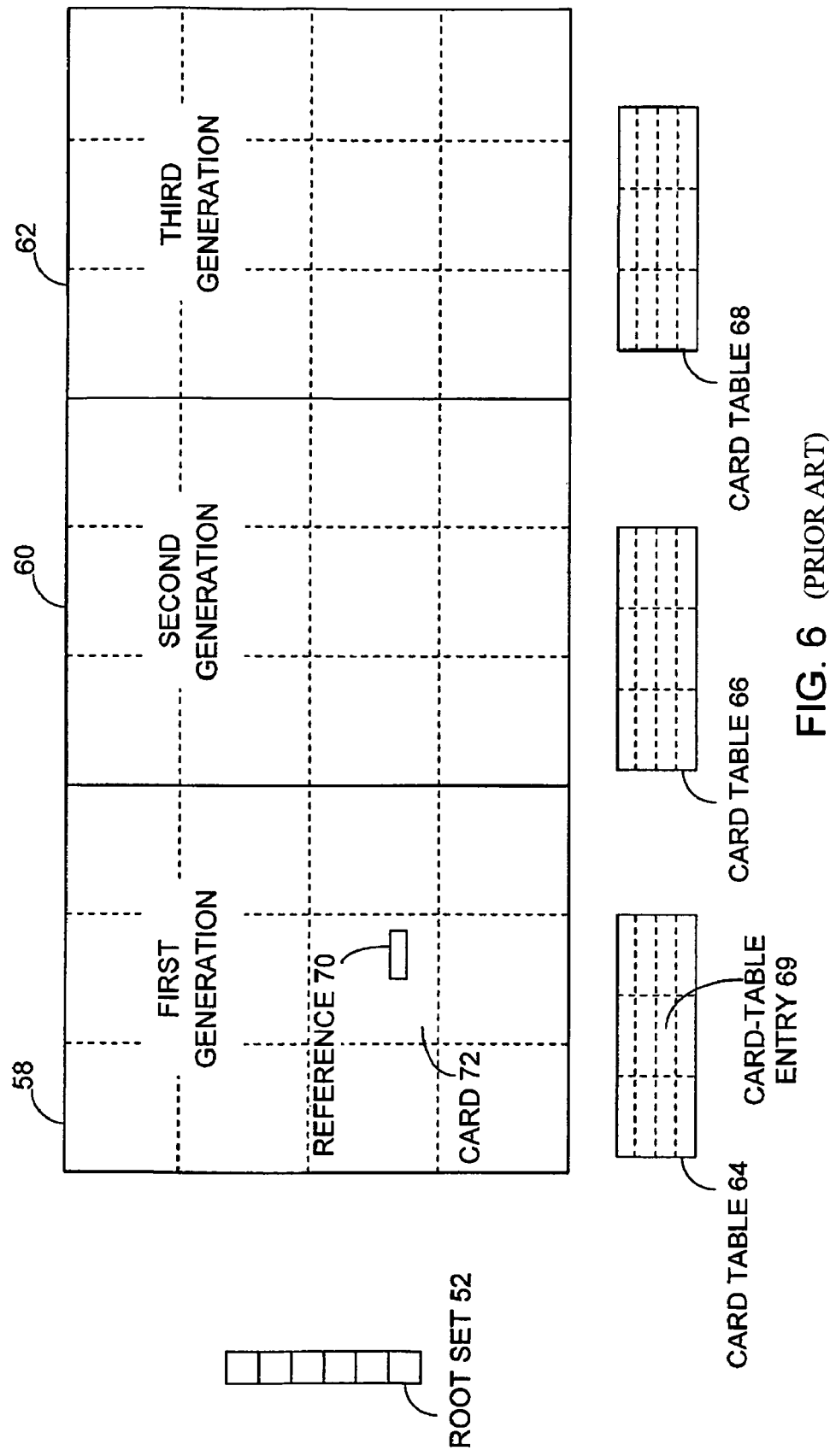
FIG. 6, discussed above, is a diagram that illustrates a garbage-collected heap's organization into generations.
Figure 7:
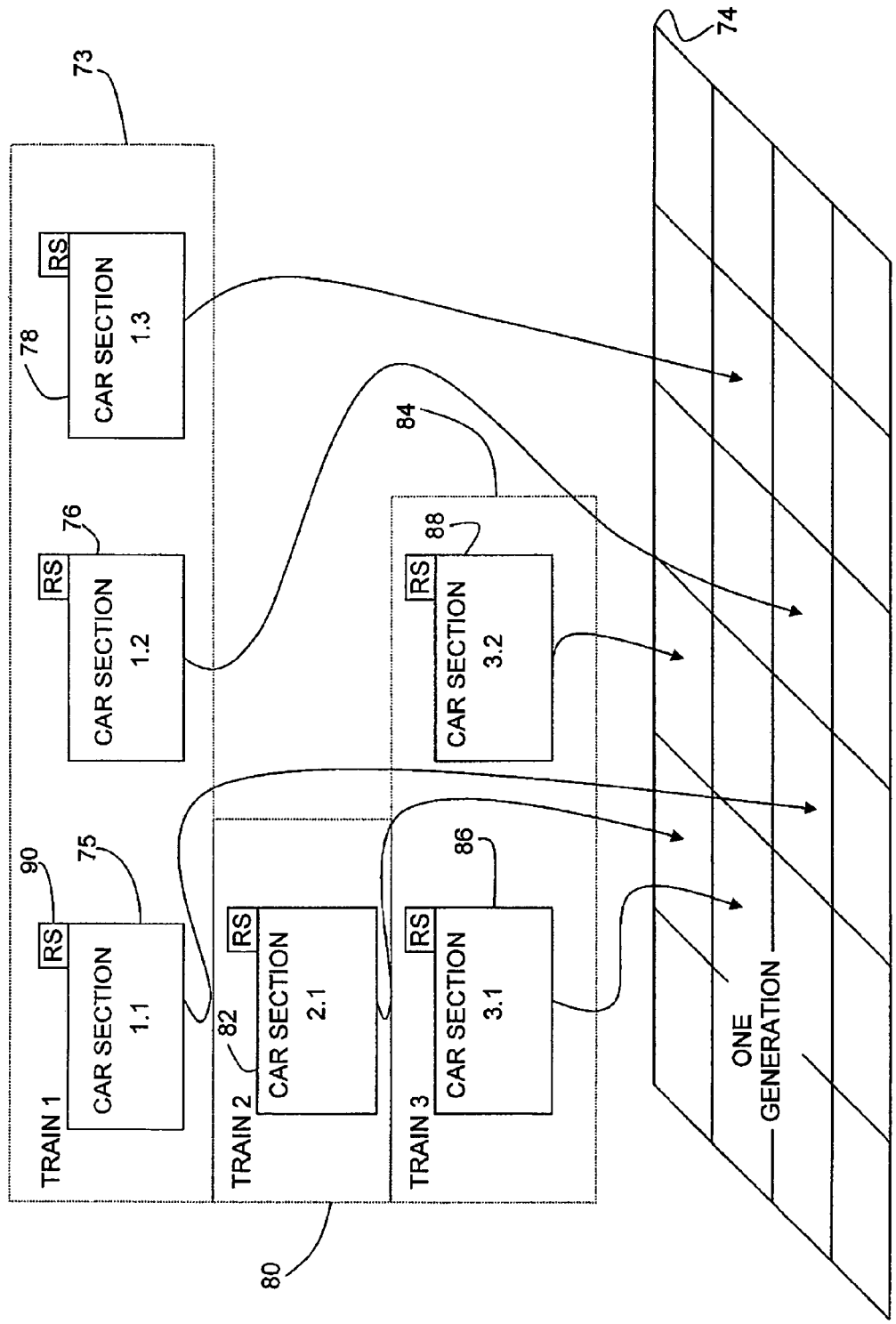
FIG. 7, discussed above, is a diagram that illustrates a generation organization employed for the train algorithm.
Figure 8A:
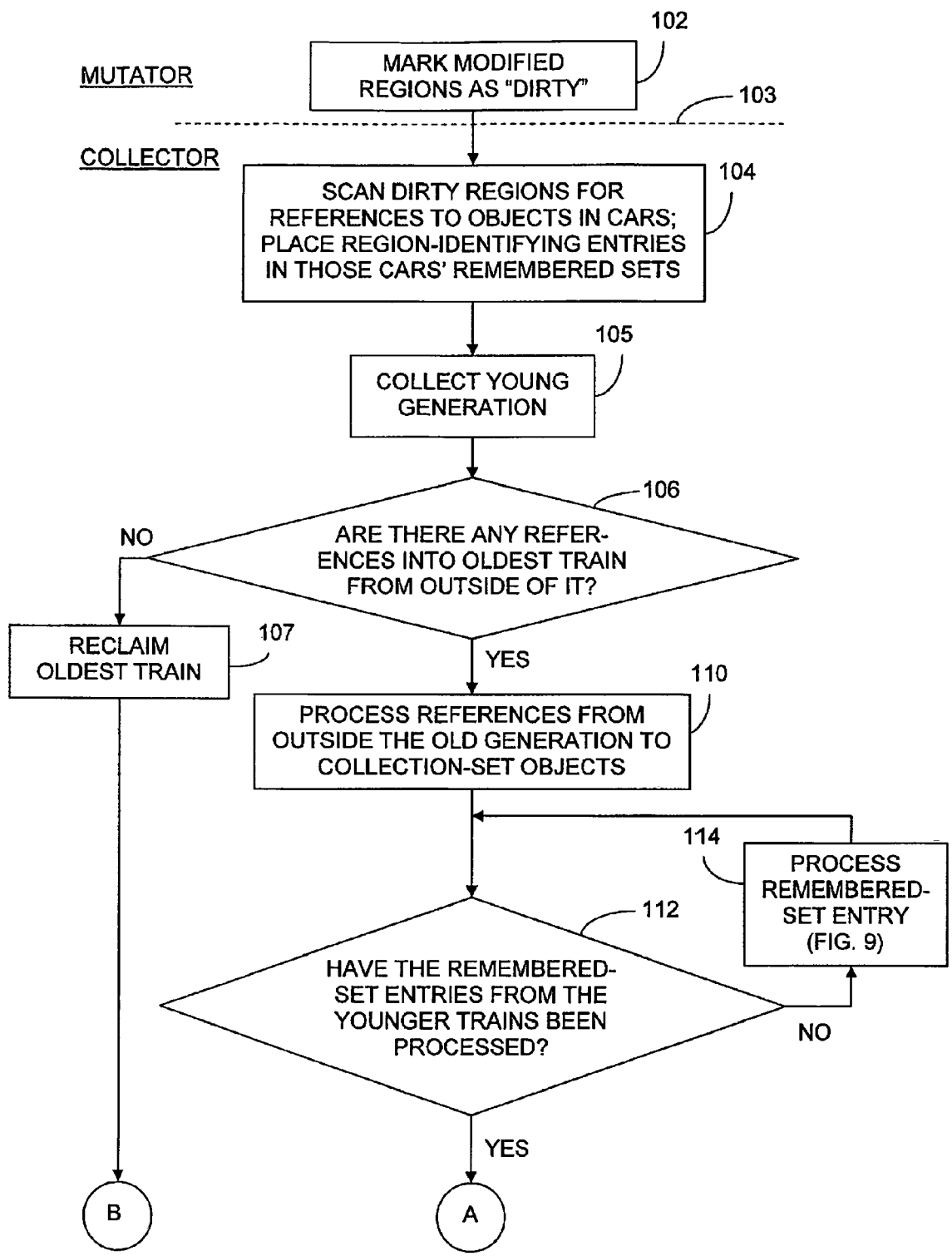
FIGS. 8A and 8B, discussed above, together constitute a flow chart that illustrates a garbage-collection interval that includes old-generation collection.
Figure 8B:
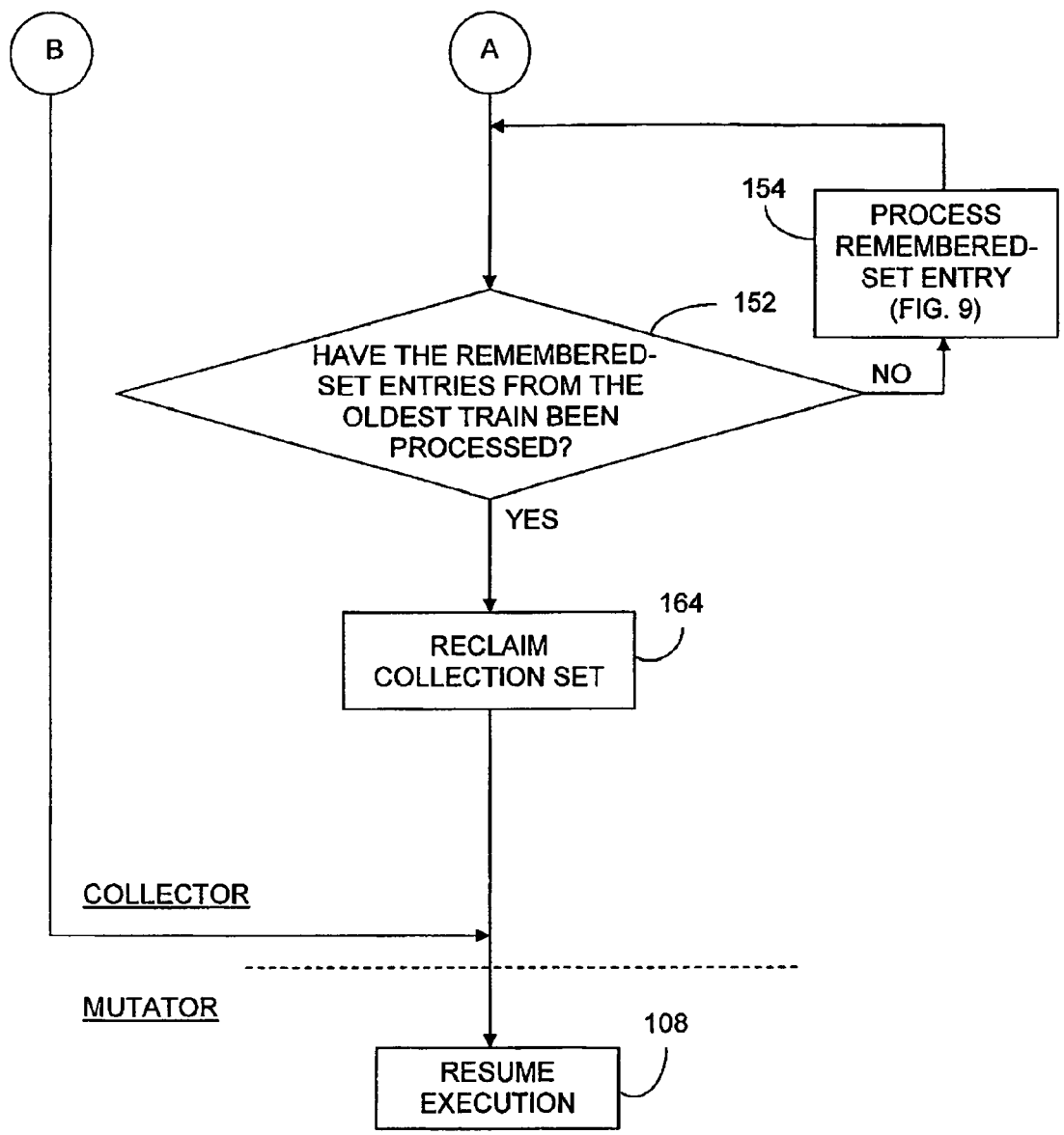
Figure 9:
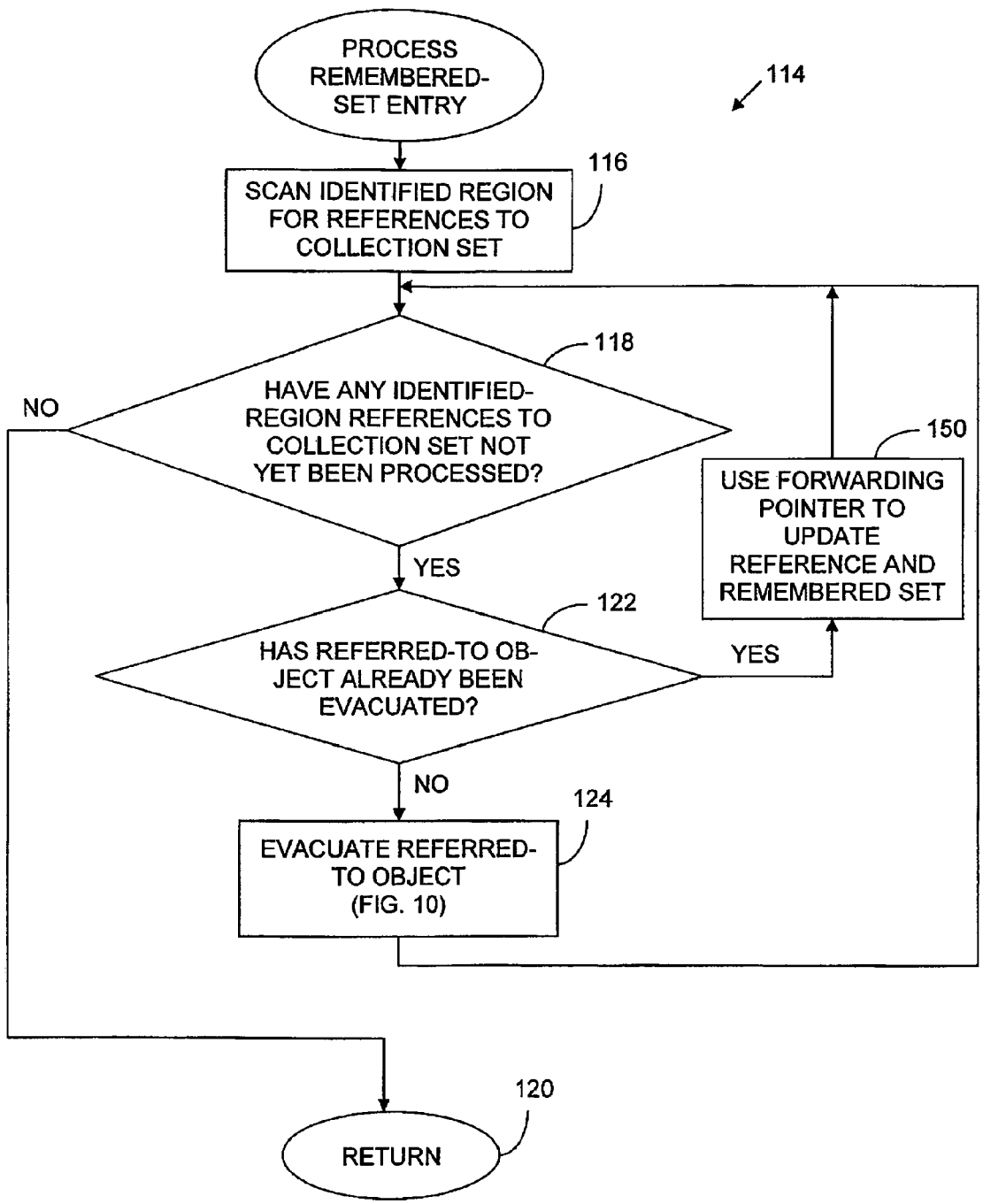
FIG. 9, discussed above, is a flow chart that illustrates in more detail the remembered-set processing included in FIG. 8A.
Figure 10:
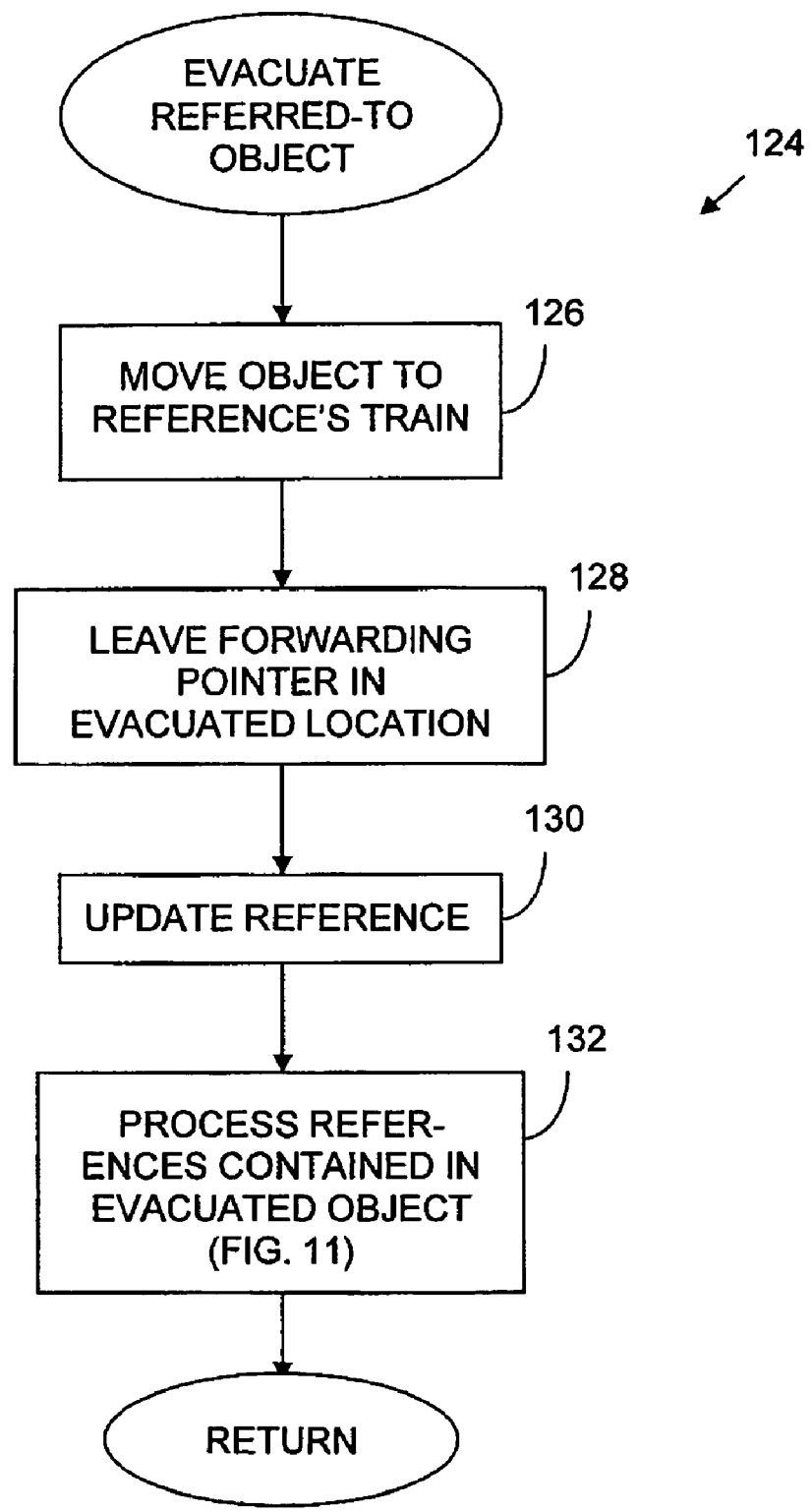
FIG. 10, discussed above, is a block diagram that illustrates in more detail the referred-to-object evacuation that FIG. 9 includes.

It will be apparent that the invention's applicability is not limited to collectors that employ the train algorithm. Even in those that do, the implementation of that algorithm need not be the same as the one described above in connection with FIGS. 8A, 8B, and 9-11, or 13A and 13B.

Cars or car sections as described hereinabove are examples of objects whose properties may determine what operations need to be performed on them, or in what manner those operations need to be performed. It may be efficient to keep track of the functions or operations to be performed on or with an object such as a car or car section, or of how those functions or operations are to be performed, in a vtable associated with that car or car section. A vtable is a collection of pointers, one for each operation listed in the vtable. One pointer corresponds to each function or operation to be performed on the object, and, depending on the current state or prior history of the object, it may point or refer to the particular variety of the operation or function that is to be associated with the object in question. In order to take full advantage of such a vtable, the pointer may be adjusted as the history or properties of the object with which it is associated change, so that the pointer may be changed to point to a different variety of the operation or function such as is now desired to be associated with the object. The use of such vtables which can be changed as the history or status of the associated object changes permits the process to perform different operations or functions on different objects, rather than the same operation or function on all objects, and it permits the operation or function to be performed on (or associated with) a particular object to be changed as circumstances dictate by merely changing the value of the pointer, without the need to change a possibly long and complicated chain of code that carries out the operation or function for the given object.

It will be apparent that a vtable may contain a set of more than one pointer for each object, in circumstances where more than one kind of operation or function may be associated with an object. For example, in connection with some embodiments of the train algorithm, there may be a pointer associated with a "scan" or "closing" function, which will point to the particular scan or closing function to be associated with the object, while as described below there may be other pointers for the same object associated with different functions, such as an "insertion" function" or a function which processes references, as will be further discussed below.

In particular, with reference to the train algorithm in general, and the embodiments of it described above, it may be desirable to perform the above operations in different ways, depending on the kind of car, and the prior history of the car, in order to achieve improved efficiencies or other benefits in the execution of the algorithm.

The workings of the invention will now be illustrated with reference to an embodiment involving vtables in conjunction with a two-generation garbage collection scheme, although it will be understood that the same principles will apply with appropriate modifications in detail in schemes involving more than two generations.

The older generation of memory managed by the train algorithm garbage collection methodology will have been divided into cars and trains as described above, and these cars and trains may be considered to be arranged from oldest to youngest, as also described, with the oldest car in the oldest train treated as the collection set for the current garbage collection interval.

It will be recalled that as mutators have carried out their functions, they have modified the references to data within the managed memory. It will further be recalled that in some embodiments as described above an entry may be placed into a card table whenever a reference in the corresponding card may have been modified. (For example, see FIG. 13A, step 172.) Such an entry, which may be a Boolean entry or may be more complex, indicates that the card with which it is associated is "dirty" and will need to be examined or scanned to look for references in the course of the garbage collection process.

It will further be recalled that in some embodiments the card table is used for two purposes: to notify the collector of the location of modified references in the heap and to summarize cross-generational references. Those skilled in the art will be aware that the first purpose may also be met with other mechanisms such as the logging of such locations to sequential store buffers. The second purpose is important for tracking references from an older generation into younger generations, since those generations will be collected independently of the older generation.

As part of scanning and summarizing the contents of modified reference locations identified through a structure like the card table, references between objects in different cars need to be properly recorded in the remembered sets associated with the cars containing the referred-to objects. It will be recalled that in such instances the recording of memory locations containing references to objects in cars need only record references from objects in younger cars to ones in older cars. This is because in embodiments such as those described herein where cars are collected from oldest to youngest, all cars older than a given car will have been collected before the given car becomes part of a collection set.

Thus, in some embodiments the card table may collect information about all references within the older generation, in other embodiments it may collect information only about references within the older generation that are into cars that are older than the car with which the card in question is associated. In any event, the card table may, however, also collect information about references into younger generations, since those generations will be collected independently of the older generation and therefore may be collected before the car associated with the card in question.

It follows from this circumstance that in collecting a younger generation, as for example in the embodiments described above, as at steps 105 and 178, it may be useful to look at the older-generation card table to determine if cards in the older generation must be scanned. While performing this scan of the older-generation cards, it may be useful also to make note of modifications to the references in the cards to objects in other cars in the older generation. These references may be put into the remembered sets for the cars in question, where it will be recalled the remembered set associated with a car is a list of locations that refer to that car. In some embodiments, a reference may be put into the remembered set of a car in the older generation only if the object to which the reference is being made is in an older car than that of the object making the reference.

In addition, as will be discussed further below, depending on the nature of the car and its history, the new reference may or may not necessarily be added to the car's remembered set. In order to effectuate this option, the car's or remembered set's vtable can be utilized to invoke an appropriate "insertion" function.

It will thus be understood that a general scanning operation may be defined which consists of scanning cards in an older generation identified as dirty both for references to a younger generation object and for references to cars or objects in cars in the older generation.

In the embodiments described above, as well as in other embodiments, this scan may be carried out for cards that have been marked as dirty in an associated card table as a mutator has modified the contents of the card. As described above, this scanning may be carried out before the younger generation is collected.

Scanning of a different nature may also be useful during the course of relocating objects while carrying out embodiments of the train algorithm described above, or other embodiments. This relocation of objects may take place when an object is promoted from a younger generation to an older generation, or when an object is evacuated from one car or train in an older generation to another. With reference to the embodiments described above, for example, an object may be relocated to a younger train in the older generation (FIG. 10) at FIG. 9, step 124 when a reference to the object (which is in the collection set) is found from a region in the younger train identified by the car's remembered set (step 118). In addition, an object may be relocated at FIG. 11B, step 140, when a reference to it has been found from another object being relocated to the younger train (step 136).

It is important to recognize that efficiencies can be realized if this scanning function carried out (which is also sometimes referred to as a closing function) is specialized, depending on the specific case, and in particular depending on the kind of car (in which the promoted or evacuated object is located after the relocation) being scanned.

It will be recalled that in an embodiment described above (and in other embodiments) a car may be of "standard" (one car-section) size, and may contain a plurality of objects. Such a car will be referred to as a "normal car." Alternatively, a car may contain an object that is too large to fit into a single standard car section. Such a car will consist of a plurality of standard-size car-sections, but will contain only a single object. Such a car will be referred to as a "special car." In addition, a car may contain only a single, popular, object. Such a car may be of smaller-than-standard-car-section size. Such a car also will be referred to as a "special car." It may be convenient to recognize two different circumstances for such a car; the object it contains may have just become popular (a "newly-popular" object), or the object it contains may have been popular in previous collection cycles (a "still-popular" object).

A newly-popular object may occur when, in the course of processing cars in the embodiments described above (or in other embodiments) it is decided that an object previously given no special treatment should now be treated as special or popular (as, for example, because the count of references to it has reached or exceeded a threshold value).

When such a decision is made, a new car may be allocated for the object, whether in a manner as described above or in another manner that may be apparent to one of ordinary skill in the art, and the newly-popular object may be moved to this new car. This car is a special car, generally of smaller-than car-section size. However, because the object has just been declared popular, it is physically being relocated, and hence as will be described below a "normal" scan must be carried out, and cards, card tables and remembered sets must be updated as appropriate to reflect the new physical location.

In the case of larger-than-car-section-size objects, and in the case of popular objects that were previously popular and remain popular, the circumstance is different. For these objects, no physical move takes place as the object is evacuated. Rather, the car containing the object is simply relinked in the linked list that forms cars into trains. Structures that record references from the older generation to the younger generation are not affected, because each entry in a card table, for example, tracks information about a corresponding card, or small contiguous range of memory, in the heap and the memory location of the newly-relinked special cars has not been changed. Therefore, in particular, with reference to the embodiments described above, at FIG. 10, step 126 the special object is not physically moved, but merely relinked. Hence, step 128, at which a forwarding pointer is installed in the address previously occupied by the evacuated object, is inapplicable, and step 130, at which the reference that caused the evacuation is updated, is unnecessary, because there has not been a physical relocation and hence the reference remains correct. Moreover, as processing continues and references in the evacuated object are processed, (FIG. 11, step 132 et seq.), there is no need to update references to the evacuated object, and so for example step 142 of FIG. 11B need not be performed. However, because as a result of the relinking the object is now in a new train, its references must be examined, and recorded and summarized as appropriate. The reason is that remembered sets may track only references in a single direction (to older cars from younger cars), and the "logical" relocation of the special object has resulted in that object now being in a different train. Hence, references by the evacuated object must be kept track of in appropriate remembered sets of the objects to which it refers. In particular, with reference to the embodiments described here, one must carry out step 146 of FIG. 11B, at which the remembered set of the referred to object may be modified to contain a reference to the evacuated object, if the referred-to object is further forward than the evacuated object.

Thus, considering only the scanning function for the moment, that function must be applied to scan and process references in the evacuated object. For objects evacuated to normal cars and to newly-popular cars, (1) references to objects in younger generations must be appropriately recorded, and (2) insofar as there are references to objects in the collection set, those objects must be processed for potential relocation themselves, and (3) after any relocation required by step (2) has taken place, appropriate entries must be placed in the remembered sets for the objects to which the evacuated object refers (i.e., if the referred-to object now is in an older car). For still-popular and "oversized" cars only the second and third operations are required. For newly-popular cars, in addition, the scanning operation must modify the vtable pointer appropriately so in subsequent cycles the car is treated as still-popular (and hence special), not as newly-popular.

In order to facilitate this processing, each car may have associated with it in its vtable a pointer to the scanning or closing function it needs to perform upon its evacuation. A normal car may have a pointer to the "full" scanning or closing function, while a "still-popular" and an over-sized car may have a pointer to the "limited" function. When an object is promoted to "popular" status, it is placed in a newly-created special car, and as stated above the pointer in the car's associated vtable must be set to reflect that in subsequent iterations the car will start with the still-popular status. On the other hand, if an object loses "popular" status, its evacuation function will cause it to be copied to a normal car, outside of the collection set, just as would happen were it part of a normal car at the start of the collection cycle, and at the end of the collection cycle its old car will be reclaimed. In that circumstance, its vtable is no longer used.

Similar considerations apply to the "insertion" function, which is used to insert references in the remembered set relating to objects in a given car, in the embodiments described and in other embodiments.

In "normal" cars, the remembered set can be of arbitrary size, if it is to keep track of all references to objects in the car. Therefore, it is desirable to be able to enlarge it as appropriate. Complete information (i.e., all references) is needed, because as objects are physically moved all references to them must be changed to reflect the new physical location.

For "special" cars, however, because they are not physically moved, there is no requirement of changing references to physical location upon logical relocation of the special car to a new train. Therefore, a complete set of references to the car need not be maintained in the car's remembered set, and instead the size of the remembered set may be arbitrarily fixed.

However, it may be desirable to keep track of certain reference locations. A fixed size remembered set may be appropriate for doing so. In one embodiment, the youngest car that refers to the car may always be maintained, as well as a predetermined number N other references.

So long as the number of references does not exceed N, the set of references will be complete; if N is exceeded, the set will no longer be complete. In such a context, if the remembered set is not full at the time the car is to be collected, there is complete information about references to the car. If the car then is tested to determine if it is still popular, there are two possibilities. The car may still be popular, if a pre-determined threshold for "continued-popularity" is met, or it may not be, if the threshold is not met. If it is still popular, the car will not be physically relocated, and hence it will not be necessary to update references to the car. If the car is no longer popular, it will no longer be treated as special, and the object that it contains will be subject to being physically relocated. However, in such a circumstance there will have been maintained a complete set of references in the remembered set (because the threshold for "continued-popularity" will not be greater than the number N of references retained for the car).

Figure 11A:
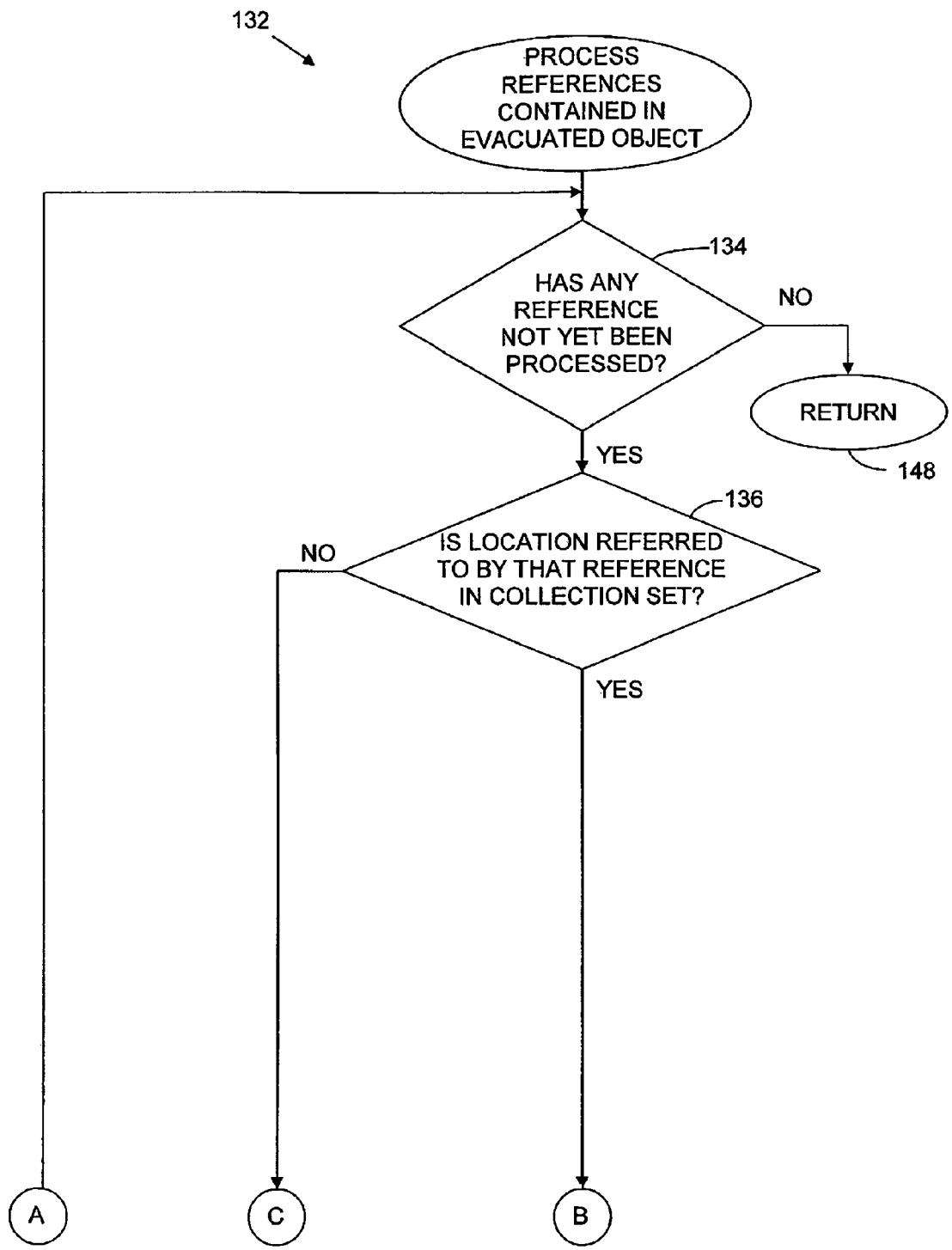
FIGS. 11A and 11B, discussed above, together form a flow chart that illustrates in more detail the FIG. 10 flow chart's step of processing evacuated objects' references.
Figure 11B:
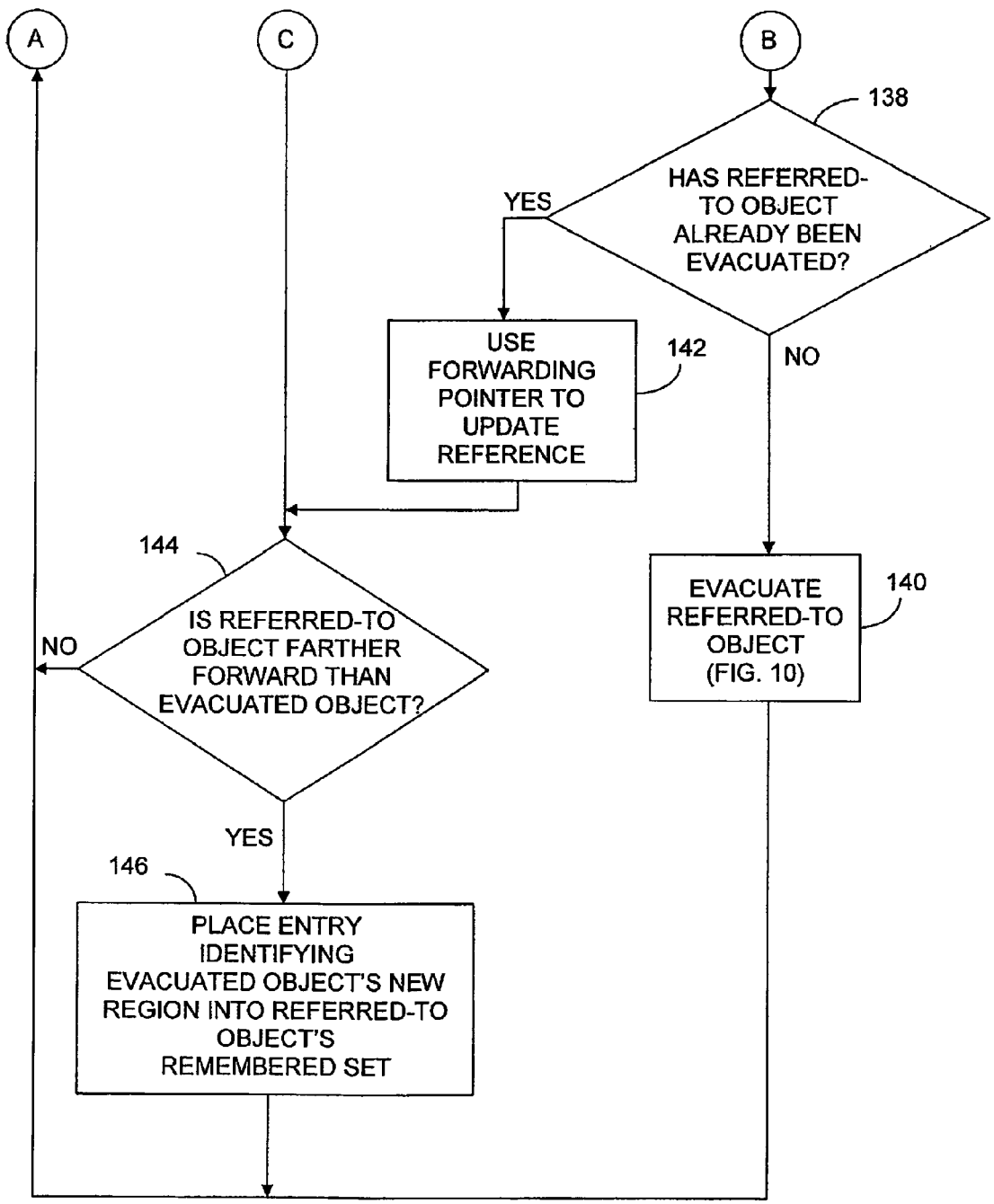
Figure 12A:
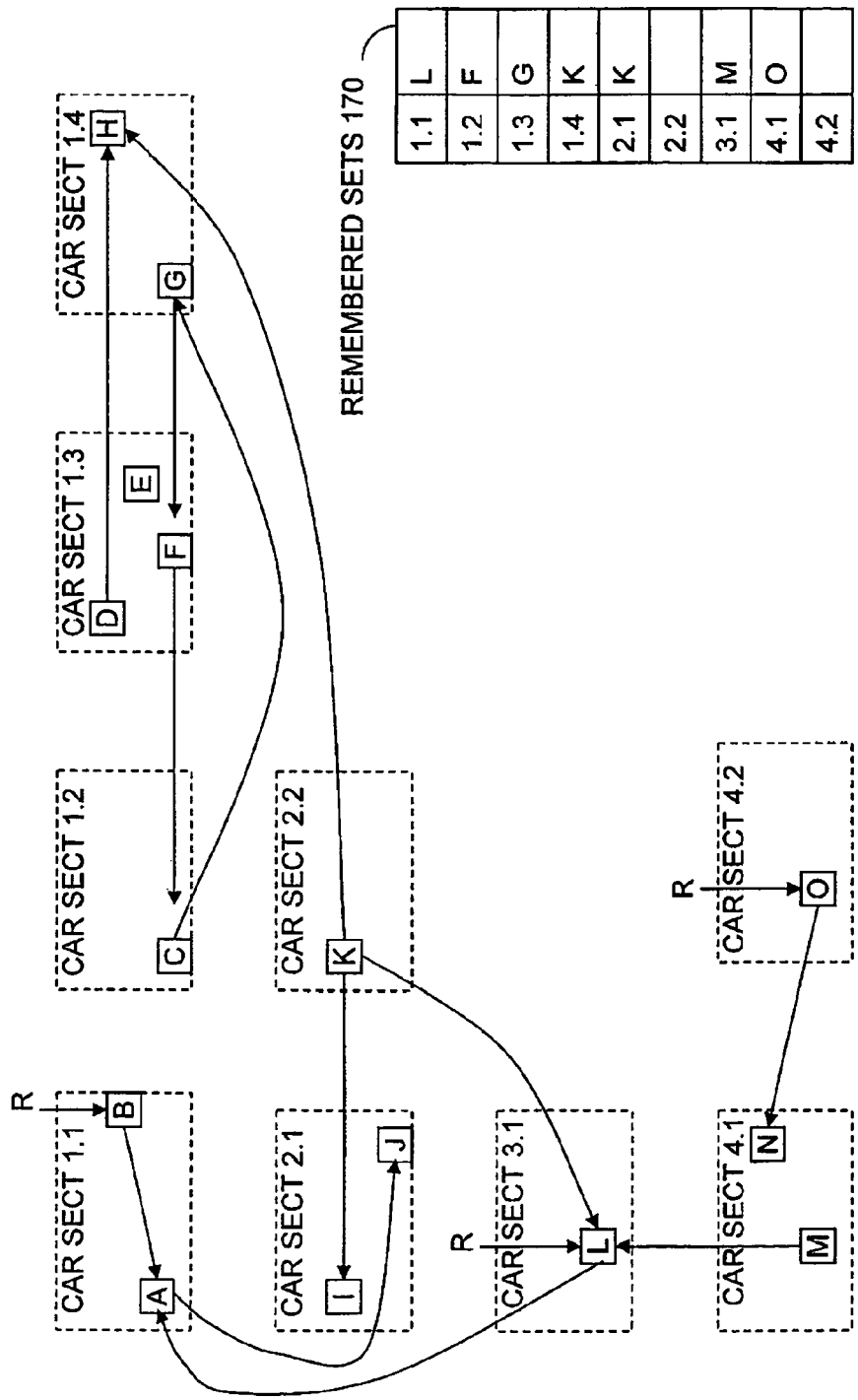
Figure 12B:
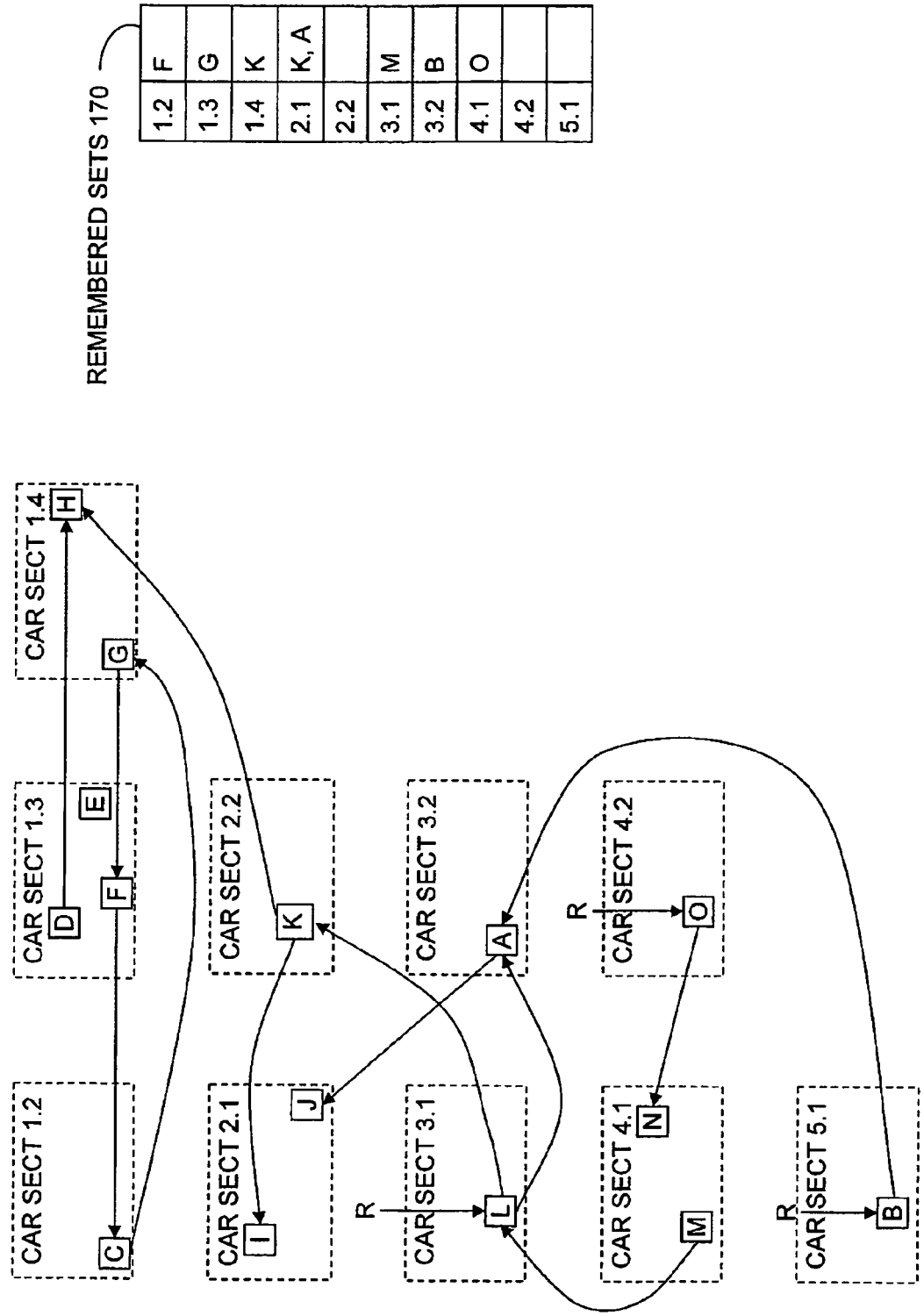
Figure 12C:
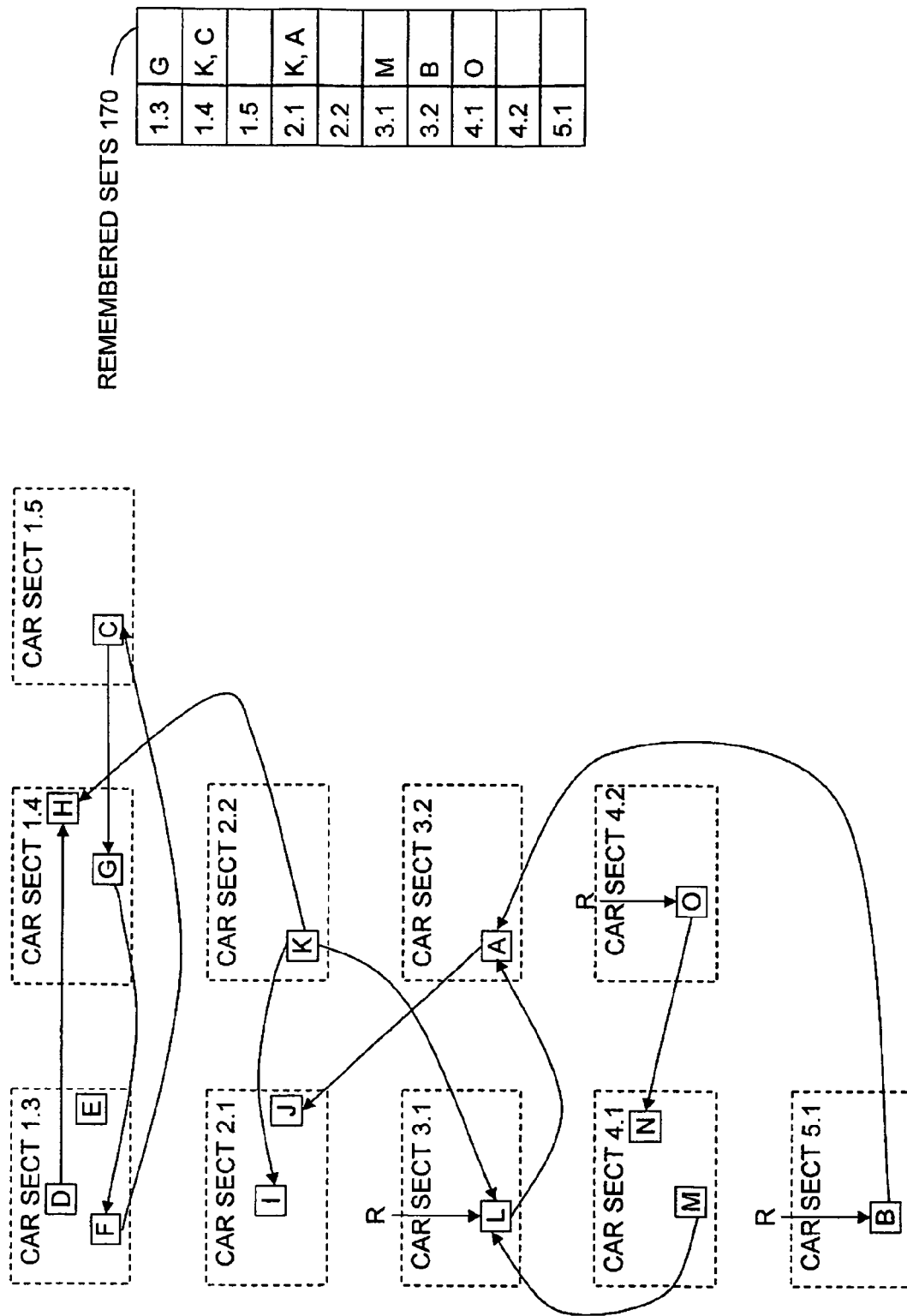
Figure 12D:
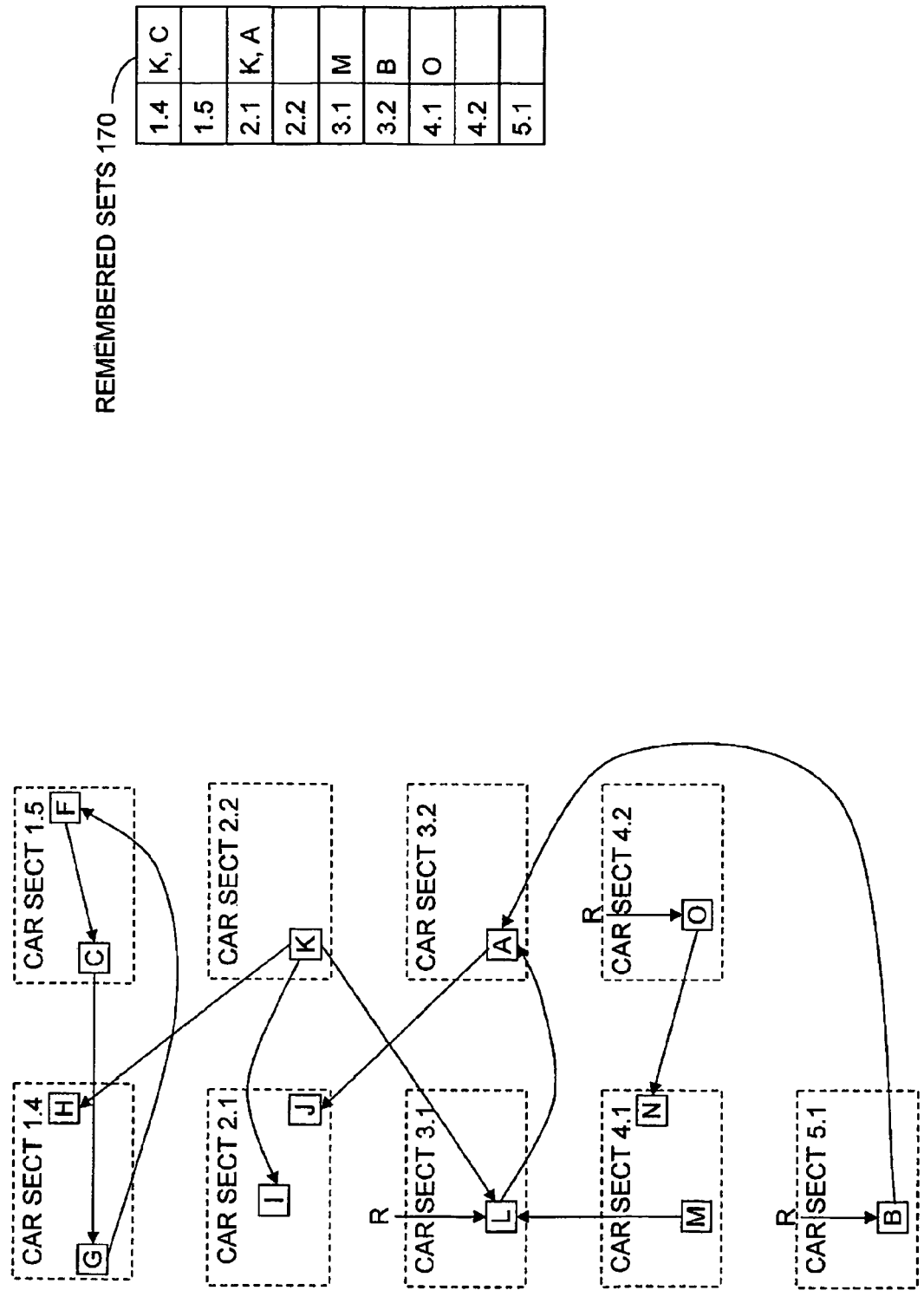
Figure 12E:
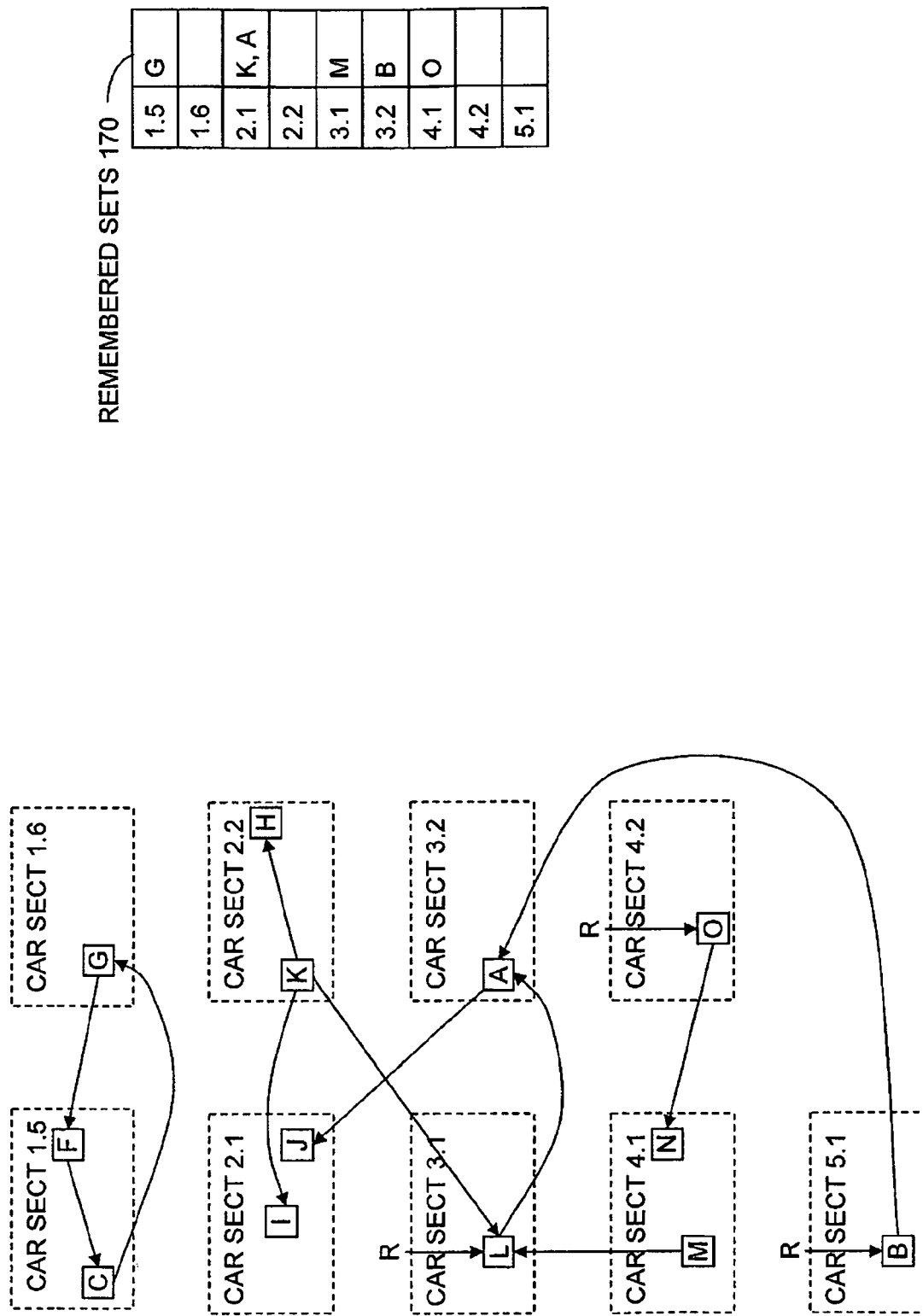
Figure 12F:
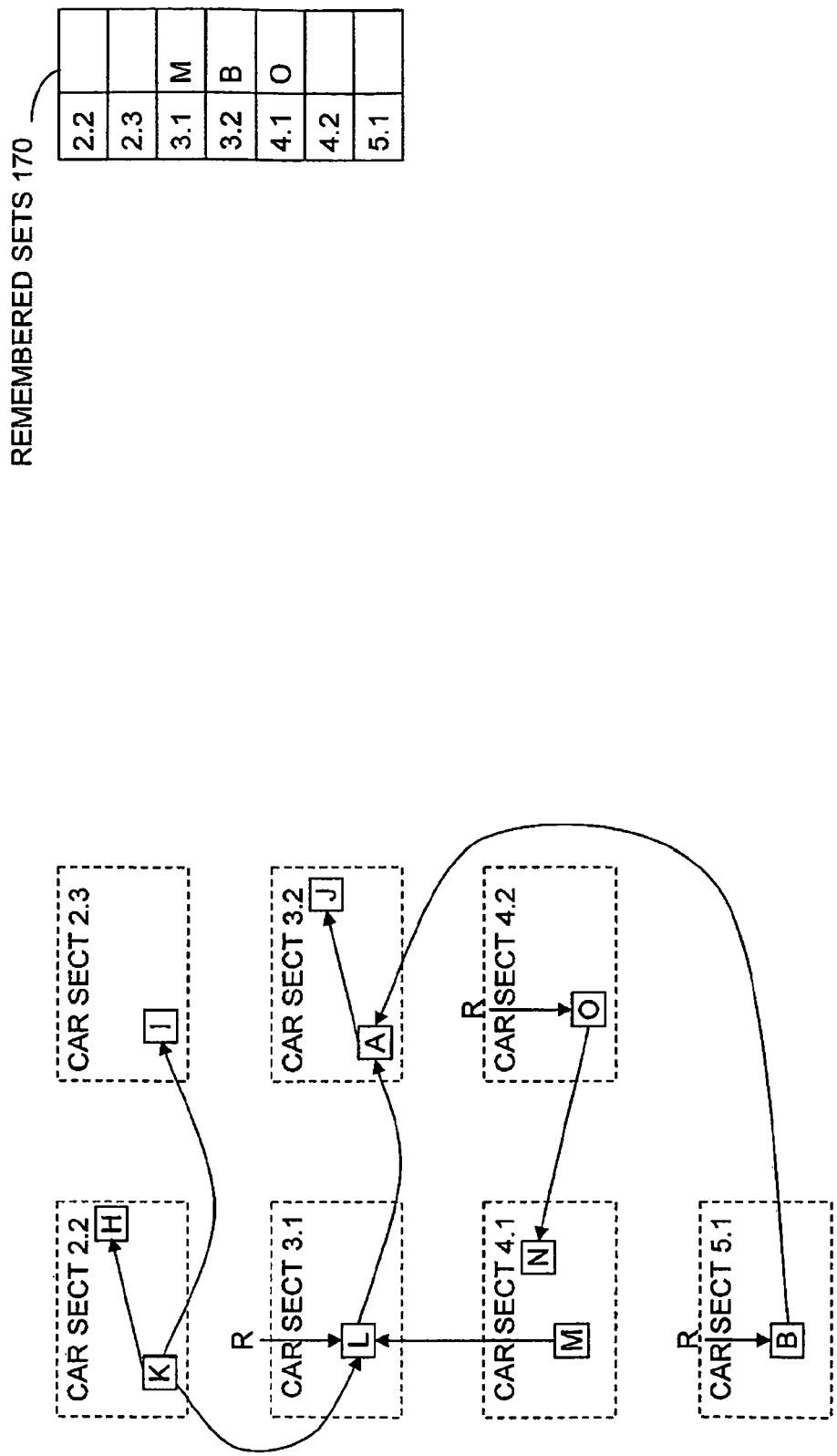
Figure 12I:
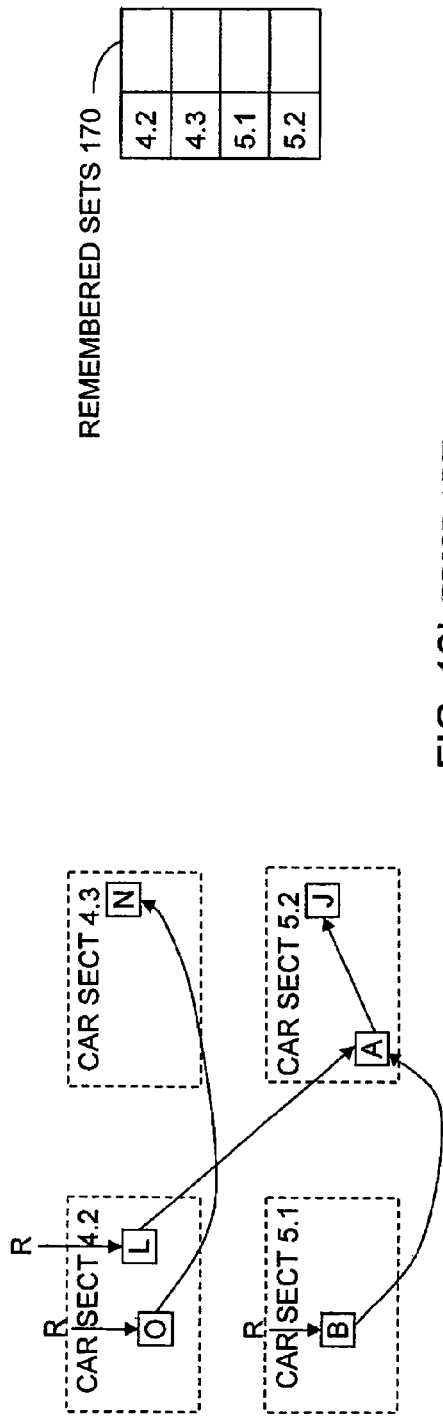
Figure 12J:
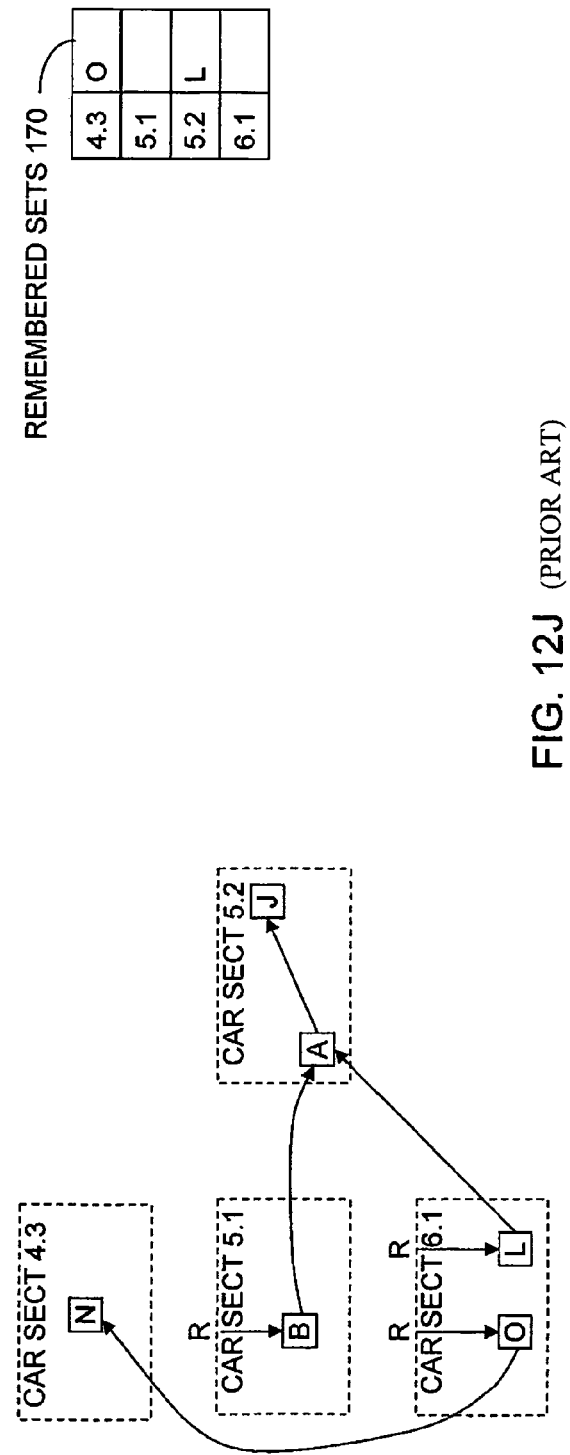
Figure 13A:
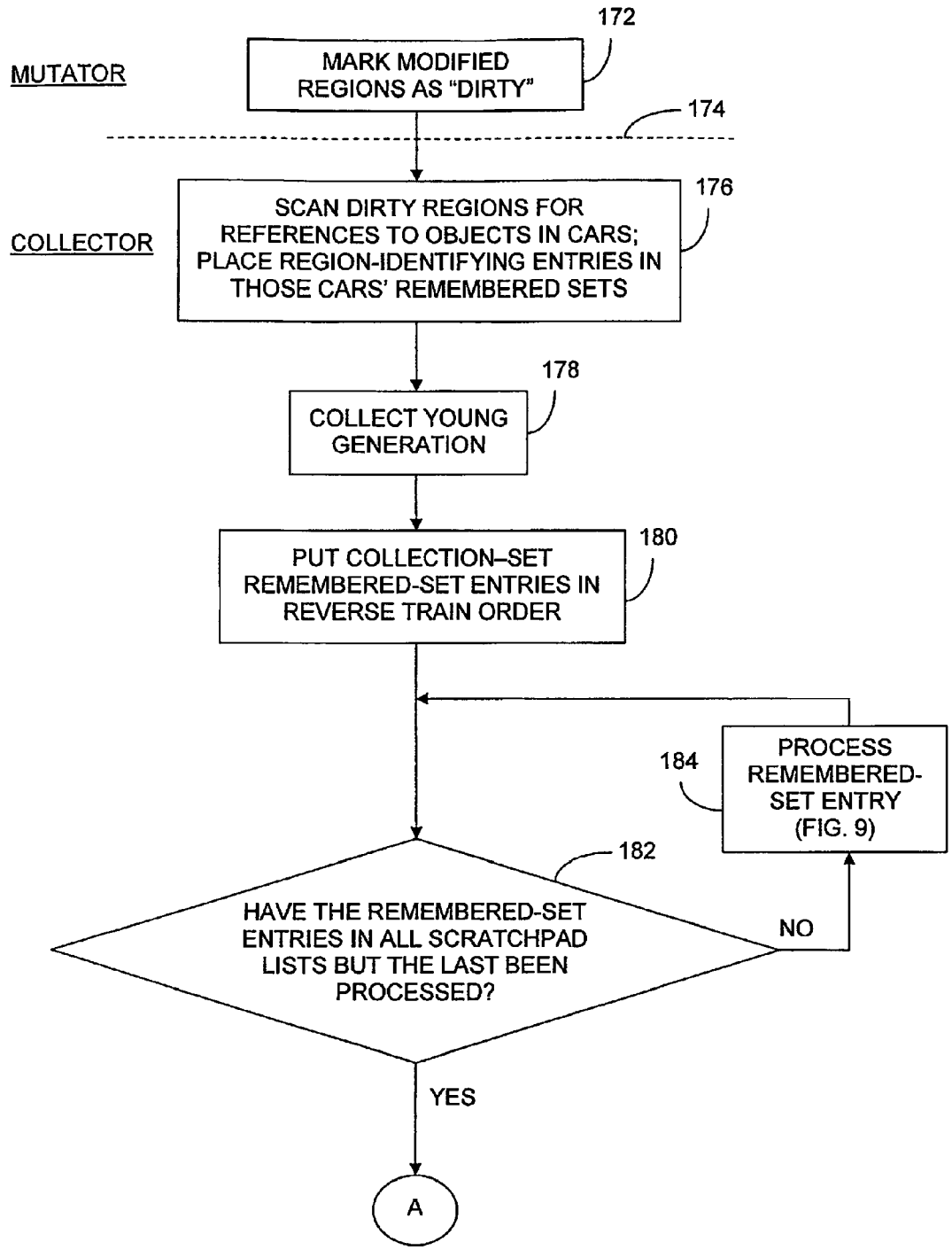
FIGS. 13A and 13B together constitute a flow chart that illustrates a collection interval, as FIGS. 8A and 8B do, but illustrates optimizations that FIGS. 8A and 8B do not include.
Figure 13B:
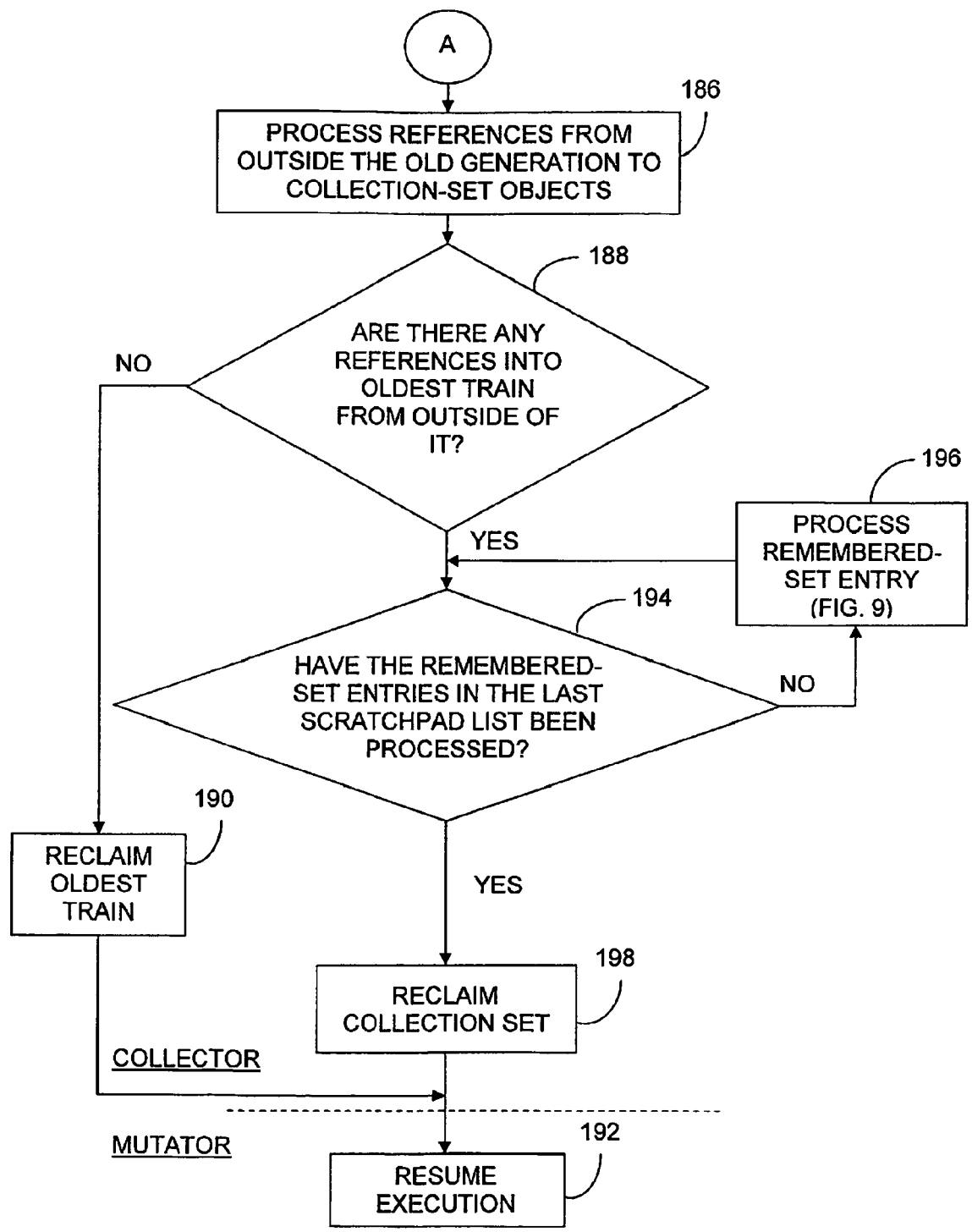
Figure 14:
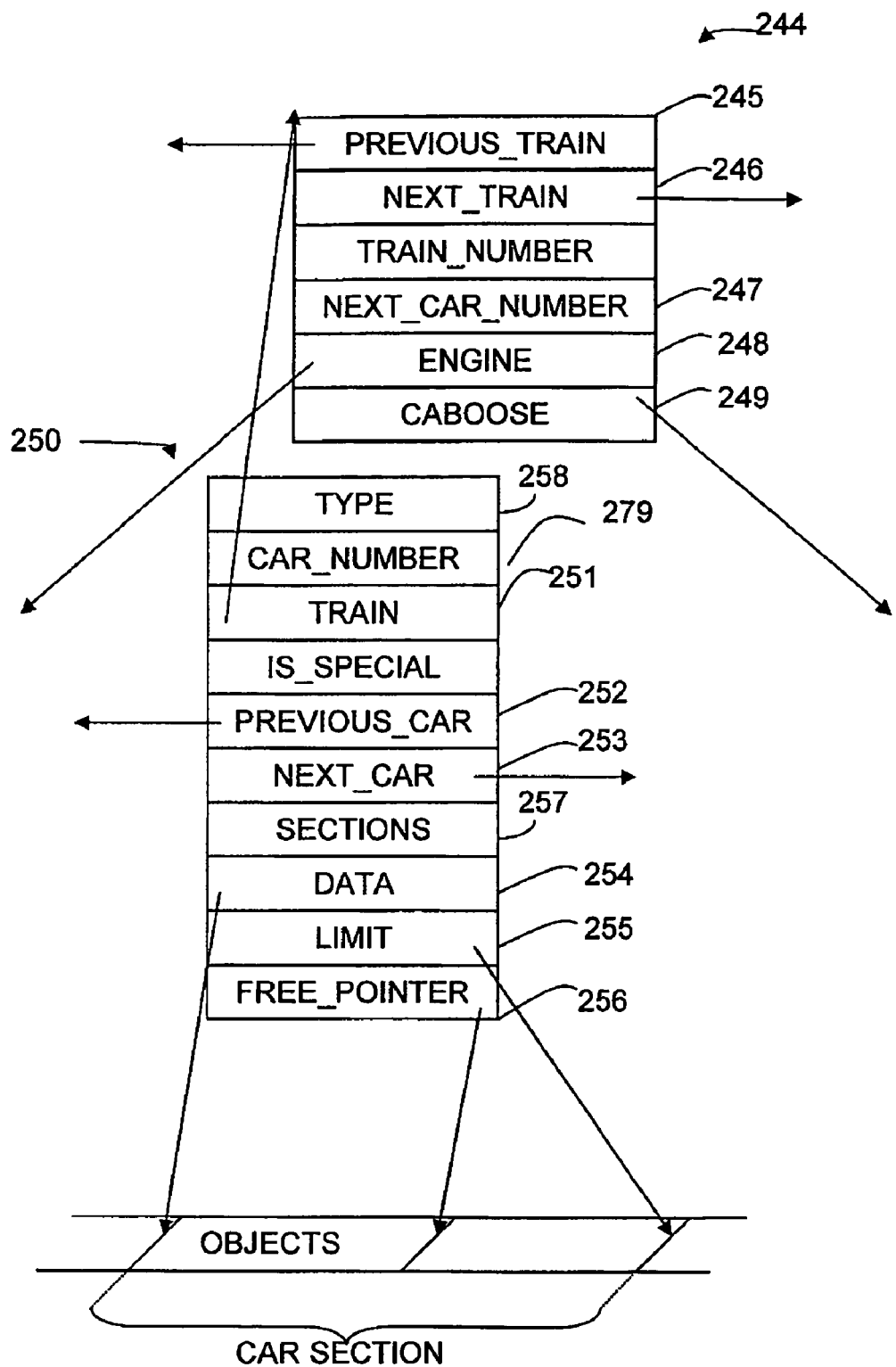
FIG. 14 is a diagram that illustrates example data structures that can be employed to manage cars and trains in accordance with the train algorithm.
Figure 15:
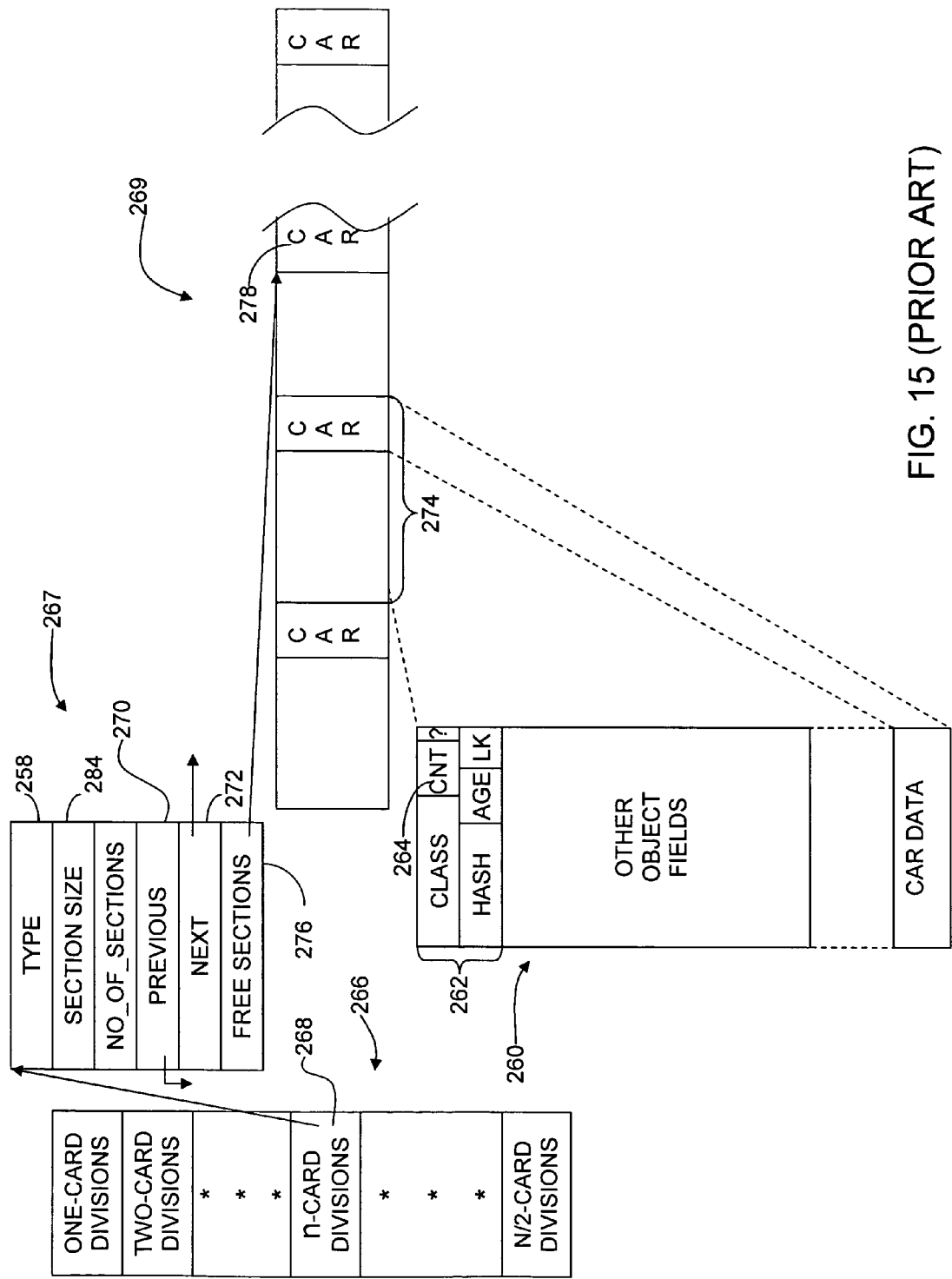
FIG. 15 is a diagram that illustrates example data structures that can be employed to manage cars and trains in accordance with the train algorithm.

With reference now to the embodiments described here, it will be recognized that the updating of an object's remembered set takes place for example at FIG. 11B, steps 144, 146, when in the course of evacuating another object it is determined that the evacuated object refers to the object. At that point, if the referred-to object is a normal object, its remembered set must be augmented. However, if the referred-to-object is a special object, then it must be augmented only under the conditions described above.

In order to facilitate this treatment, a pointer in the vtable of the car or its remembered set may be utilized. That pointer may point to the complete or exhaustive "insertion" function for "normal" cars, while for oversized and popular special cars it may point to a variety of the function which only places an entry in the remembered set associated with the car if fewer than "N" entries have yet been made, or if the proposed entry would be to a car that is younger than that relating to any existing entry. More specifically, for oversized and popular special cars, two different pointers could be utilized. The first could be in place so long as there were fewer than "N" entries in the remembered set; upon the "Nth" entry being made, the vtable pointer could be changed so that future invocations of the operation did not attempt to add the entry to the remembered set unless the reference would be from a car that is younger than that relating to any existing entry.

It may be recognized that as a car moves from its initial car status toward greater seniority its remembered set will increase. When an object is evacuated however, the evacuation is to a train with the youngest reference to the object. This means that the just-evacuated object contributes nothing to its (new) car's remembered set on its evacuation. For special cars—those that are relinked because they are oversized or still popular—this means that the relinked car is given an empty, fixed-size remembered set. As part of the evacuation process, in the case of special cars which are relinked, we reset the vtable pointer for its remembered-set insertion operation to point to an operation that allows insertion into a fixed sized remembered set containing fewer than "N" entries. Then, as the car again gains seniority, the contents of its remembered set again increase, until again it is processed for collection and the cycle repeats.

In normal cars, therefore, when inserting all reference locations must be placed in the (unbounded) remembered set, while for special cars reference locations must only be inserted until the fixed number of slots available is full, and thereafter a new reference only must be inserted (in place of an existing one) if the new reference is from a car that is younger than the youngest car thus far in the remembered set. (Note of course that oversized cars are treated as popular cars for this insertion function, except that they do not need to be tested for continued popularity.)

In this and other embodiments of the invention, as discussed above, vtables associated with cars may contain pointers to appropriate scanning or closing functions for the cars. The scanning or closing function for a newly-popular car resets the car's vtable at the end of the scanning or closing function, so that in future the car is treated as a previously-popular special car; the vtables for other cars do not contain pointers to a scanning or closing function with that "vtable reset" operation.

In this and other embodiments, a vtable may be associated with a car or with the remembered set of the car, and contain a pointer to an appropriate "insertion" function which, for a normal car, requires that every reference to an object in a car from a younger car is inserted in the remembered set, while for a special car with fewer than "N" entries in its remembered set also requires that all such references are inserted (and upon the "Nth" entry being made changes the vtable pointer), and for a special car with "N" references in its remembered set requires that a new reference be inserted, replacing an existing one, only if the new reference is from a car younger than that associated with any existing reference.

In this and other embodiments, a vtable associated with a car may contain a pointer for the "reference processing" function, which pointer determines if the objects in the car are relinked upon evacuation, as in the case of oversized and still-popular special cars, or whether they are physically relocated (copied), as in the case of objects in normal or formerly-popular cars. (An object relocated from a normal car may be placed in another normal car, or in a newly-popular car.) In addition, for physically-relocated objects, the reference processing function must update the references to the relocated objects to reflect the new physical location, while this is not necessary for objects that are simply relinked.

Figure 16:
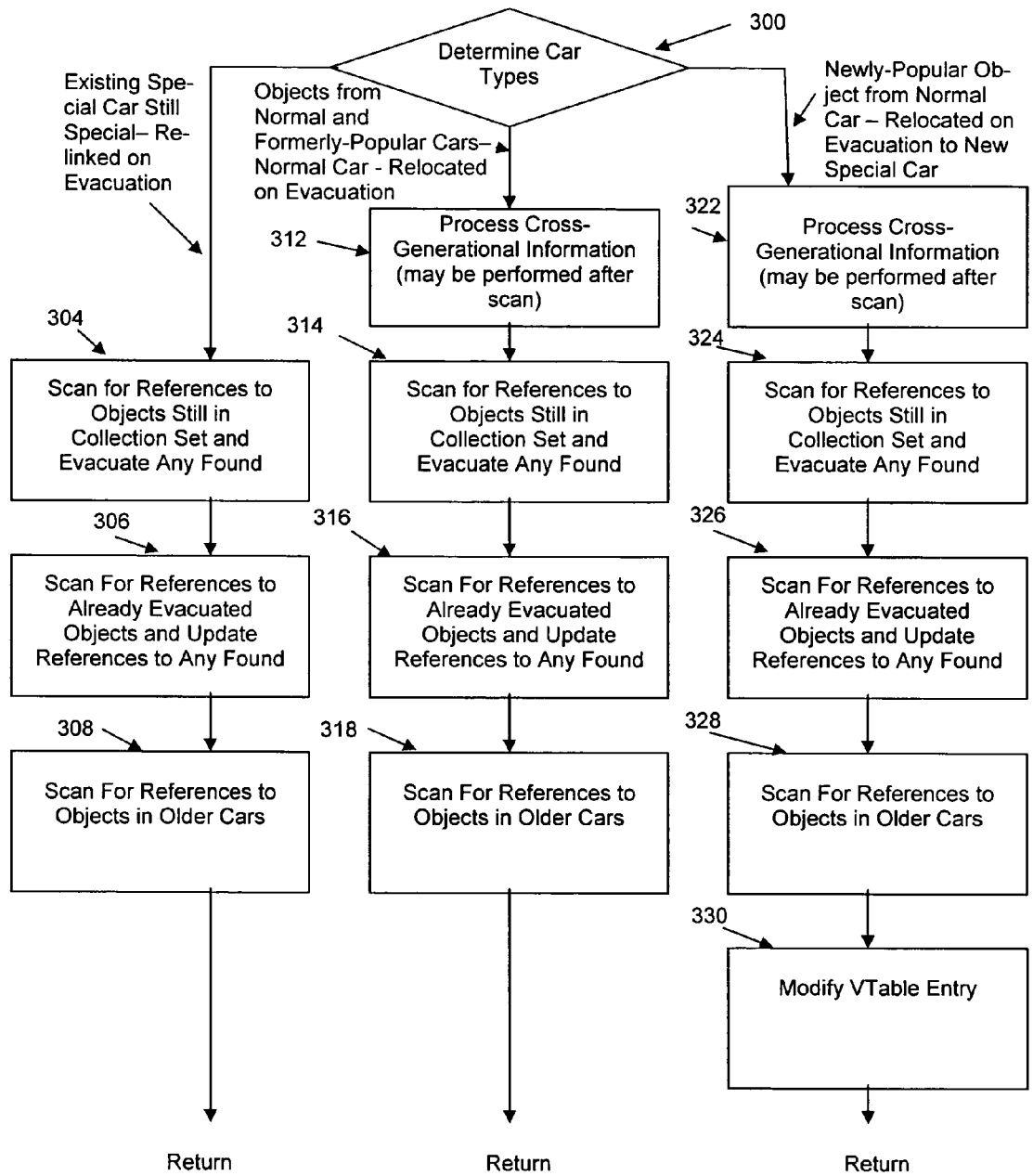
FIG. 16 is a flow chart illustrating processing the updating of references with respect to evacuated objects.

FIG. 16 describes an embodiment of the inventions described herein wherein the processing functions utilized depend on the characteristics of the cars and objects being processed. As stated, an evacuated object is either copied into a younger car, if it is from a normal or formerly-popular car, or relinked, if its car is oversized or still-popular. (Copied objects, as noted, may be copied to either normal or newly-popular cars.) Then, the evacuated objects must be (1) scanned to find references back to other objects still in the collection set (and these objects in turn must be evacuated and scanned as described herein); (2) scanned for references to already-evacuated objects (and these references must be updated to reflect the new locations of those objects); (3) scanned for references to objects in older cars; and (4) if the object is in a normal or newly-popular car, processed to maintain proper cross-generational information, and in particular references into younger generations. (Note that although for conceptual clarity we here describe the scans for the different purposes as sequential, in actual operation a single scan may be performed that finds and processes any of the kinds of references found.)

FIG. 16 illustrates an approach of scanning sequentially all the relocated objects in a car, and processing the references into the collection set. The approach is at the car level, not the object level. Vtables as described above may be utilized for each car to provide the appropriate pointer to the desired scanning function for that car.

First, with reference to FIG. 16, at step 300 it is determined whether the car in question is a car previously treated as special (i.e., containing an oversized object or a still-popular object), such that the object within it upon evacuation has been relinked but not moved physically. This step may be effectively performed by the expedient of referring to the vtable for the car in question, which will have associated with it the pointer for the corresponding car type; the pointer in effect identifies the car type. Cars that have previously been treated as special need not be scanned for cross-generational information, as any such required updating was accomplished when the object was made special and placed in the special car. Hence, the vtable pointers for these cars provide only that the cars are scanned for references to objects still in the collection set (step 304) (which objects then are evacuated), to objects already evacuated (step 306) (as to which the references must be updated if the evacuated object has been moved), and to objects in older cars (whose associated remembered sets must have appropriate entries made) (step 308).

However, cars not previously treated as special (i.e., normal cars and cars with newly-created special objects) require additional scanning, for cross-generational references as described above.

At step 300, if it was determined by reference to the car's vtable that the car was a normal car, the vtable pointer(s) would provide that the steps beginning at 312 be followed.

There are two options for proceeding. In the first option, step 312, which processes the cross-generational information, is handled initially. Cross-generational information may be summarized in a card and card table mechanism, and that mechanism may be rearranged and associated with the new location of the relocated object. "Sliding" the card table may be an operation known to persons of skill in the art for performing this operation, or the references in the evacuated object may be examined in their new locations and duly summarized in the card table.

Once this function is performed, the remaining functions are similar to those used for the relinked existing special cars. Thus, steps 314, 316 and 318 perform the functions of steps 304, 306 and 308.

In the second option for normal cars, steps 314, 316 and 318 are performed first, so that the object is scanned for references to objects still in the collection set (and any found are evacuated), for references to objects already evacuated from the collection set (and the references to those objects updated), and for references to objects in older cars. Only after that is step 312 performed and cross-generational information processed. Such references are recorded and flagged in a manner that will ensure that the reference will be scanned when the young generation is collected. (For example, when the card table mechanism is used, the card table corresponding to the reference location must be marked.) References into younger generations are infrequent enough that simple flagging to require a scan of the associated memory may be efficient. (In other embodiments, a more precise location could be stored if desired.)

Finally, FIG. 16 illustrates the process to be followed when at step 300 it is determined by reference to the car vtable that the car is a newly-created special car. In such a case, the car's vtable pointer provides that at step 322 it is determined if there is a reference in the car to the younger generation. If there is such a reference, the car is treated as a normal car would be, as described in connection with step 312. In addition, in any event steps 324, 326 and 328 must be performed, corresponding to steps 304, 306 and 308 as described above, to scan for references to objects still in the collection set, already evacuated objects, and objects in older cars. Finally, in the case of these newly-popular objects, the associated vtable must be modified at the conclusion of the operations at step 330 so that in future cycles the car is treated as a previously-existing special car being relinked upon evacuation.

It will be recognized that the descriptions given here have been with reference to specific embodiments of the train algorithm. These descriptions have been for illustrative purposes only, however, and it will be understood by a person of skill in the art that the techniques set forth herein are of more general applicability to any embodiment of the train algorithm in which scanning and inserting functions occur, and in which they may be done in different ways depending upon the characteristics of the objects involved. Indeed, a person of skill in the art will further recognize that the techniques are also applicable for other garbage collection methodologies than the train algorithm.

What is claimed is:

1. A method for employing a computer system including memory as a garbage collector that treats a generation of a heap in the memory as divided into cars grouped into trains ordered in a nominal collection order and collects in collection increments respective collection sets of those cars in accordance with the train algorithm, wherein, in at least some of the collection increments:

A) for a car of said cars in a train of said trains, a remembered set and a virtual table (vtable) are associated with said car and a scratch-pad-list is associated with the train, wherein the vtable is separate from the remembered set;

B) said vtable stores a pointer to an operation related to said car to be performed, wherein said operation to be performed includes the step of modifying the pointer stored in said vtable to reference a different operation related to said car, such that a subsequent reference to said vtable results in the modified pointer invoking the different operation related to said car to be performed by said program;

C) said operation to be performed is an insertion operation;

D) in the case of said car being a normal car, the pointer to said insertion operation invokes an operation in which an entry is inserted into said remembered set associated with said car;

E) in the case of said car being a special car which has a predetermined number of entries in said remembered set associated with said car, the pointer to said insertion operation invokes an operation in which a further entry is not inserted into said remembered set when said further entry relates to an object in a car which car is not younger than all of the cars associated with existing entries in said remembered set; and F) in the case of said car being a special car which has fewer than said predetermined number of entries in said remembered set associated with the car, the pointer to said insertion operation invokes an operation in which a further entry is inserted into said remembered set, and in the event that said insertion causes the number of entries in the remembered set to reach said predetermined number, said operation modifies said pointer contained in said vtable, such that a subsequent reference to said vtable associated with said car results in the modified pointer invoking the insertion operation according to step C).

2. The method as defined in claim 1, wherein

G) a second operation to be performed is a reference processing operation,

H) in the case of said car comprising a formerly-popular object, the pointer to said reference processing operation invokes an operation in which an object in said car is copied to another car, and I) in the case of said car being an oversized car or a car which contains a still-popular object, the pointer to said reference processing operation invokes an operation in which an object in said car is relinked.

3. The method as defined in claim 2, wherein

J) in the case of said car being a car which contains a formerly-popular object, and another object containing a reference to said copied object, the pointer to said reference processing operation invokes an operation in which the reference in the other object to said copied object is updated, and K) in the case of said car being an oversized car or a car which contains a still-popular object, the pointer to said reference processing operation invokes an operation in which references in other objects to said relinked object are not updated.

4. The method as defined in claim 1, wherein in the case of said car being a special car which has a predetermined number of entries in said remembered set associated with said car, the pointer to said insertion operation invokes an operation in which a further entry is inserted into said remembered set when said further entry relates to an object in a car which car is younger than all of the cars associated with existing entries in said remembered set.

5. The method as defined in claim 1, wherein

G) a second operation to be performed is a scanning operation,

H) in the case of said car being a newly-popular car and an object in said car having been evacuated from the collection set, and said evacuated object containing a reference to another object, the pointer to said scanning operation invokes an operation in which the reference in said evacuated object to another object is appropriately recorded when said other object is in an older car than the evacuated object and in which the reference in said evacuated object to another object is appropriately recorded when said other object is in a younger generation; and I) in the case of said car being an oversized car or a car which contains a still-popular object, and an object in said car having been evacuated from the collection set, and said evacuated object containing a reference to another object, the pointer to said scanning operation invokes an operation in which the reference in said evacuated object to another object is appropriately recorded when said other object is in an older car than the evacuated object and in which the reference in said evacuated object to another object is not recorded when said other object is in a younger generation.

6. The method as defined in claim 5, wherein, in the operation which the pointer to said scanning operation invokes, a reference in said evacuated object to the object in an older car is appropriately recorded by placing an entry in a remembered set of said object in an older car to which said evacuated object refers.

7. The method as defined in claim 5, wherein, in the operation which the pointer to said scanning operation invokes, a reference in said evacuated object to the object in an older car is appropriately recorded by placing an entry in a remembered set of said object in an older car to which said evacuated object refers except in the event that said remembered set is of fixed size and full and the car which contains said evacuated object is not younger than all of the cars associated with existing entries in said remembered set.

8. The method as defined in claim 5, wherein, in the case of said car being a newly-popular car, the pointer to said scanning operation invokes an operation which modifies said pointer, such that a subsequent reference to said vtable associated with said car results in the modified pointer invoking the scanning operation for a car with a still-popular object.

9. A computer system including memory and configured as a garbage collector that treats a generation of a heap in the memory as divided into cars grouped into trains ordered in a nominal collection order and collects in collection increments respective collection sets of those cars in accordance with the train algorithm, wherein, in at least some of the collection increments:

A) for a car of said cars in a train of said trains, a remembered set and a virtual table (vtable) are associated with said car and a scratch-pad-list is associated with the train, wherein the vtable is separate from the remembered set; and B) said vtable stores a pointer to an operation related to said car to be performed, wherein said operation to be performed includes the step of modifying the pointer stored in said vtable to reference a different operation related to said car, such that a subsequent reference to said vtable results in the modified pointer invoking the different operation related to said car to be performed by said program;

C) said operation to be performed is an insertion operation;

D) in the case of said car being a normal car, the pointer to said insertion operation invokes an operation in which an entry is inserted into said remembered set associated with said car;

E) in the case of said car being a special car which has a predetermined number of entries in said remembered set associated with said car, the pointer to said insertion operation invokes an operation in which a further entry is not inserted into said remembered set when said further entry relates to an object in a car which car is not younger than all of the cars associated with existing entries in said remembered set; and F) in the case of said car being a special car which has fewer than said predetermined number of entries in said remembered set associated with the car, the pointer to said insertion operation invokes an operation in which a further entry is inserted into said remembered set, and in the event that said insertion causes the number of entries in the remembered set to reach said predetermined number, said operation modifies said pointer contained in said vtable, such that a subsequent reference to said vtable associated with said car results in the modified pointer invoking the insertion operation according to step C).

10. The system as defined in claim 9, wherein

G) a second operation to be performed is a reference processing operation;

H) in the case of said car comprising a formerly-popular object, the pointer to said reference processing operation invokes an operation in which an object in said car is copied to another car; and I) in the case of said car being an oversized car or a car which contains a still-popular object, the pointer to said reference processing operation invokes an operation in which said car is relinked.

11. The system as defined in claim 10, wherein

J) in the case of said car being a car which contains a formerly-popular object, and another object containing a reference to said copied object, the pointer to said reference processing operation invokes an operation in which the reference in the other object to said copied object is updated; and K) in the case of said car being an oversized car or a car which contains a still-popular object, the pointer to said reference processing operation invokes an operation in which references in other objects to said relinked object are not updated.

12. The system as defined in claim 9, wherein in the case of said car being a special car which has a predetermined number of entries in said remembered set associated with said car, the pointer to said insertion operation invokes an operation in which a further entry is inserted into said remembered set when said further entry relates to an object in a car which car is younger than all of the cars associated with existing entries in said remembered set.

13. The system as defined in claim 9, wherein
G) a second operation to be performed is a scanning operation;
H) in the case of said car being a newly-popular car and an object in said car having been evacuated from the collection set, and said evacuated object containing a reference to another object, the pointer to said scanning operation invokes an operation in which the reference in said evacuated object to another object is appropriately recorded when said other object is in an older car than the evacuated object and in which the reference in said evacuated object to another object is appropriately recorded when said other object is in a younger generation; and
I) in the case of said car being an oversized car or a car which contains a still-popular object, and an object in said car having been evacuated from the collection set, and said evacuated object containing a reference to another object, the pointer to said scanning operation invokes an operation in which the reference in said evacuated object to another object is appropriately recorded when said other object is in an older car than the evacuated object and in which the reference in said evacuated object to another object is not recorded when said other object is in a younger generation.

14. The system as defined in claim 13, wherein, in the operation which the pointer to said scanning operation invokes, a reference in said evacuated object to the object in an older car is appropriately recorded by placing an entry in a remembered set of said object in an older car to which said evacuated object refers.

15. The system as defined in claim 13, wherein, in the operation which the pointer to said scanning operation invokes, a reference in said evacuated object to the object in an older car is appropriately recorded by placing an entry in a remembered set of said object in an older car to which said evacuated object refers except in the event that said remembered set is of fixed size and full and the car which contains said evacuated object is not younger than all of the cars associated with existing entries in said remembered set.

16. The system as defined in claim 13, wherein, in the case of said car being a newly-popular car, the pointer to said scanning operation invokes an operation which modifies said pointer, such that a subsequent reference to said vtable associated with said car results in the modified pointer invoking the scanning operation for a car with a still-popular object.

17. A storage medium containing instructions readable by a computer system including memory to configure the computer system as a garbage collector that treats a generation of a heap in the memory as divided into cars grouped into trains ordered in a nominal collection order and collects in collection increments respective collection sets of those cars in accordance with the train algorithm, wherein, in at least some of the collection increments:

A) for a car of said cars in a train of said trains, a remembered set and a virtual table (vtable) are associated with said car and a scratch-pad-list is associated with the train, wherein the vtable is separate from the remembered set;
B) said vtable stores a pointer to an operation related to said car to be performed,
wherein said operation to be performed includes the step of modifying the pointer stored in said vtable to reference a different operation related to said car, such that a subsequent reference to said vtable associated with said car results in the modified pointer invoking the different operation related to said car to be performed by said program;
C) said operation to be performed is an insertion operation;
D) in the case of said car being a normal car, the pointer to said insertion operation invokes an operation in which an entry is inserted into said remembered set associated with said car;
E) in the case of said car being a special car which has a predetermined number of entries in said remembered set associated with said car, the pointer to said insertion operation invokes an operation in which a further entry is not inserted into said remembered set when said further entry relates to an object in a car which car is not younger than all of the cars associated with existing entries in said remembered set; and
F) in the case of said car being a special car which has fewer than said predetermined number of entries in said remembered set associated with the car, the pointer to said insertion operation invokes an operation in which a further entry is inserted into said remembered set, and in the event that said insertion causes the number of entries in the remembered set to reach said predetermined number, said operation modifies said pointer contained in said vtable, such that a subsequent reference to said vtable associated with said car results in the modified pointer invoking the insertion operation according to step C).

18. The storage medium as defined in claim 17, wherein
G) a second operation to be performed is a reference processing operation;
H) in the case of said car comprising a car which contains a formerly-popular object, the pointer to said reference processing operation invokes an operation in which an object in said car is copied to another car; and
I) in the case of said car being an oversized car or a car which contains a still-popular object, the pointer to said reference processing operation invokes an operation in which said car is relinked.

19. The storage medium as defined in claim 18, wherein
J) in the case of said car being a car which contains a formerly-popular object, and another object containing a reference to said copied object, the pointer to said reference processing operation invokes an operation in which the reference in the other object to said copied object is updated; and
K) in the case of said car being an oversized car or a car which contains a still-popular object, the pointer to said reference processing operation invokes an operation in which references in other objects to said relinked object are not updated.

20. The storage medium as defined in claim 17, wherein in the case of said car being a special car which has a predetermined number of entries in said remembered set associated with said car, the pointer to said insertion operation invokes an operation in which a further entry is inserted into said remembered set when said further entry relates to an object in a car which car is younger than all of the cars associated with existing entries in said remembered set.

21. The storage medium as defined in claim 17, wherein

G) a second operation to be performed is a scanning operation;

H) in the case of said car being a newly-popular car and an object in said car having been evacuated from the collection set, and said evacuated object containing a reference to another object, the pointer to said scanning operation invokes an operation in which the reference in said evacuated object to another object is appropriately recorded when said other object is in an older car than the evacuated object and in which the reference in said evacuated object to another object is appropriately recorded when said other object is in a younger generation; and I) in the case of said car being an oversized car or a car which contains a still-popular object, and an object in said car having been evacuated from the collection set, and said evacuated object containing a reference to another object, the pointer to said scanning operation invokes an operation in which the reference in said evacuated object to another object is appropriately recorded when said other object is in an older car than the evacuated object and in which the reference in said evacuated object to another object is not recorded when said other object is in a younger generation.

22. The storage medium as defined in claim 21, wherein, in the operation which the pointer to said scanning operation invokes, a reference in said evacuated object to the object in an older car is appropriately recorded by placing an entry in a remembered set of said object in an older car to which said evacuated object refers.

23. The storage medium as defined in claim 21, wherein, in the operation which the pointer to said scanning operation invokes, a reference in said evacuated object to the object in an older car is appropriately recorded by placing an entry in a remembered set of said object in an older car to which said evacuated object refers except in the event that said remembered set is of fixed size and full and the car which contains said evacuated object is not younger than all of the cars associated with existing entries in said remembered set.

24. The storage medium as defined in claim 21, wherein, in the case of said car being a newly-popular car, the pointer to said scanning operation invokes an operation which modifies said pointer, such that a subsequent reference to said vtable associated with said car results in the modified pointer invoking the scanning operation for a car with a still-popular object.

* * * * *